US010452453B1

(12) United States Patent
Kumar et al.

(10) Patent No.: US 10,452,453 B1
(45) Date of Patent: Oct. 22, 2019

(54) SNAPSHOT LINEAGE PRESERVATION FOR REPRESENTATION-BASED PARTITIONS

(71) Applicant: Amazon Technologies, Inc., Seattle, WA (US)

(72) Inventors: Sandeep Kumar, Sammamish, WA (US); Ankit Singh, Seattle, WA (US); Varun Verma, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 15/902,950

(22) Filed: Feb. 22, 2018

(51) Int. Cl.
| | |
|---|---|
| *G06F 15/173* | (2006.01) |
| *G06F 9/50* | (2006.01) |
| *G06F 11/07* | (2006.01) |
| *G06F 3/06* | (2006.01) |

(52) U.S. Cl.
CPC .......... *G06F 9/5061* (2013.01); *G06F 3/0644* (2013.01); *G06F 3/0647* (2013.01); *G06F 11/0727* (2013.01); *G06F 2201/84* (2013.01)

(58) Field of Classification Search
CPC .. G06F 9/5061; G06F 11/0727; G06F 3/0644; G06F 3/0647; G06F 3/065; G06F 3/0653
See application file for complete search history.

(56) References Cited

U.S. PATENT DOCUMENTS

| 5,835,953 | A   | * | 11/1998 | Ohran    | G06F 11/1451 |
|-----------|-----|---|---------|----------|--------------|
|           |     |   |         |          | 711/162      |
| 2003/0101321 | A1 | * | 5/2003 | Ohran    | G06F 11/1451 |
|           |     |   |         |          | 711/162      |
| 2006/0053139 | A1 | * | 3/2006 | Marzinski | G06F 11/1435 |
| 2014/0089264 | A1 | * | 3/2014 | Talagala | G06F 11/1471 |
|           |     |   |         |          | 707/649      |
| 2018/0113625 | A1 | * | 4/2018 | Sancheti | G06F 11/1402 |
| 2018/0113632 | A1 | * | 4/2018 | Sancheti | G06F 9/45533 |
| 2018/0276085 | A1 | * | 9/2018 | Mitkar   | G06F 3/064   |

* cited by examiner

*Primary Examiner* — Jonathan A Bui
(74) *Attorney, Agent, or Firm* — Davis Wright Tremaine LLP

(57) ABSTRACT

A router of a block-level data storage service receives a request to generate a snapshot of a block device. The router, based on routing metadata for the block-level data storage service, identifies active metadata that indicates a first cell that may maintain the block device and alternate metadata that indicates a second cell that may maintain the block device. Based on a first state of the block device in the first cell, a second state of the block device in the second cell, and a predetermined set of rules defining operations corresponding to outcomes associated with the first state and the second state, the router determines which of the first cell and the second cell authoritatively maintains the block device. The router transmits the request to the appropriate cell in accordance with the predetermined set of rules.

20 Claims, 13 Drawing Sheets

| Rule | Path 1 | | | Path 2 | | | Resolution |
|---|---|---|---|---|---|---|---|
| | Present | PreCreate | Migration | Present | PreCreate | Migration | |
| 802 | True | False | False | True | False | False | Fault |
| 804 | True | False | False | True | False | True | Path 1 |
| 806 | True | False | False | False | True | False | Path 1 |
| 808 | True | False | True | True | False | False | Path 2 |
| 810 | True | False | True | True | False | True | Retry |
| 812 | True | False | True | False | True | False | Retry |
| 814 | True | True | False | True | False | False | Retry |
| 816 | True | True | False | True | False | True | Path 2 |
| 818 | True | True | False | False | True | False | Retry |
| 820 | True | True | False | False | False | True | Fault |
| 822 | False | False | False | True | False | False | Path 2 |
| 824 | False | False | False | True | False | True | Path 2 |
| 826 | False | False | False | False | True | False | Retry |
| 828 | False | False | False | True | True | True | Path 1 |
| 830 | False | False | False | True | True | False | Path 1 |
| 832 | False | False | False | False | False | False | Fault |

FIG. 8

SNAPSHOT LINEAGE PRESERVATION FOR REPRESENTATION-BASED PARTITIONS

CROSS-REFERENCE TO RELATED APPLICATIONS

This application incorporates by reference for all purposes the full disclosures of co-pending U.S. patent application Ser. No. 15/902,930, filed concurrently herewith, entitled "REVERSIBLE REPRESENTATION-BASED PARTITIONING OF DISTRIBUTED COMPUTING ENVIRONMENTS," and co-pending U.S. patent application Ser. No. 15/902,840, filed concurrently herewith, entitled "REPRESENTATION-BASED PARTITIONING OF DISTRIBUTED COMPUTING ENVIRONMENTS."

BACKGROUND

Many entities seeking to reduce the expense and overhead associated with maintaining their own computing resources, such as data storage and computing capacity, have turned to solutions offered by computing resource service providers. Such distributed computing systems provide customers with the ability to generate virtual devices, such as block storage devices, as well as the ability to manipulate incremental backups and state snapshots thereof. Such snapshots can, in some implementations, also become the basis of one or more new block storage devices, which in turn can also have snapshots generated therefrom. As the number of snapshots and volumes generated in the distributed computing system grows larger, the computing resources required to service related activity may also become quite large, and in some cases, unevenly distributed (relative to the activity and/or costs associated with a given snapshot or volume) across the resources of the computing resource service provider.

BRIEF DESCRIPTION OF THE DRAWINGS

Various techniques will be described with reference to the drawings, in which:

FIG. 8 shows an illustrative example of a truth table usable to determine a set of actions to be performed by the router based at least in part on responses from cells in accordance with at least one embodiment;

DETAILED DESCRIPTION

Figure 1:
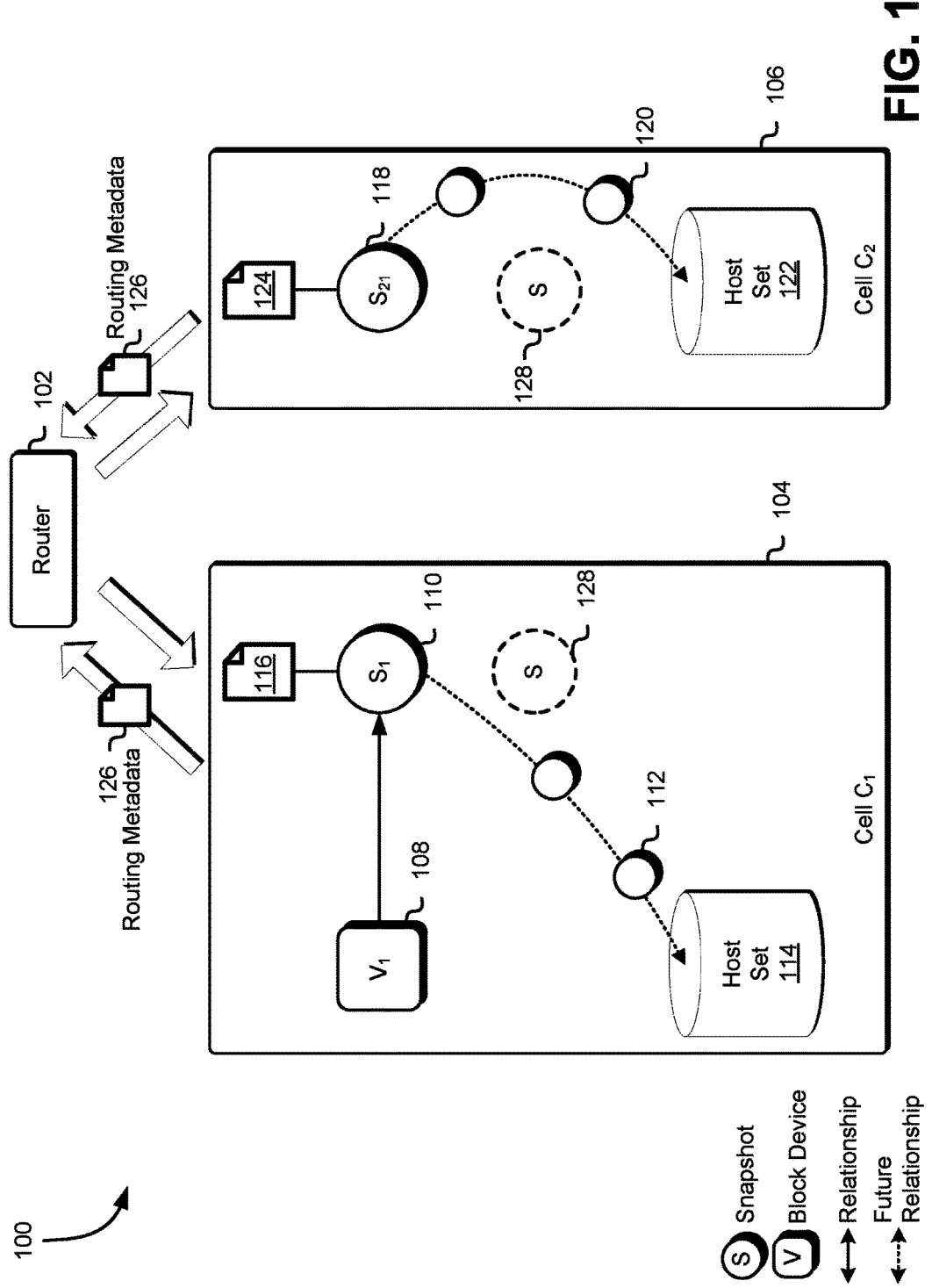
FIG. 1 shows an illustrative example of a system in which various embodiments can be implemented.

Techniques described and suggested herein relate to a reversible partitioning system of a block-level data storage service for the distribution of computing resource usage attributable to the use of block devices and snapshots of these block devices. In one example, a set of block devices and corresponding snapshots of the block devices are provisioned on behalf of a user or group of users of a computing resource service provider. The set of block devices may store arbitrary data content of the user in block device data storage. A representation management service may generate a graph representation indicating various relationships between the block devices and snapshots. The various relationships may be analyzed to determine resource usage associated with the block devices and/or the snapshots wherein the resource usage corresponds to a mutation operation rate or number of mutation operations performed (or scheduled for performance). As a result of determining that the resource usage exceeds a predetermined threshold for resource usage, the representation management service may partition a cell of the representation that is responsible for the high resource usage. For instance, a cell containing a block device or snapshot having a high resource usage associated therewith may be partitioned into a plurality of cells, and the corresponding block device or snapshot may be assigned to a new cell.

In an example, a router of the block-level data storage service receives a request to generate a snapshot corresponding to a particular volume. The router may utilize a finite state machine for managing routing metadata usable to identify the location of volumes, snapshots, and other resources within the various cells. In an example, the finite state machine is in a "started" state when the router is activated. In an example, the router transmits a request to each cell maintained by a block-level data storage service to obtain routing metadata to identify the location of the particular volume within the cells of the block-level data storage service. The router may evaluate the routing metadata from each of the cells to build a consensus of the state of the resources within the various cells. A hash table containing a plurality of hash value ranges may be established, and block devices and/or snapshots may be assigned to a corresponding cell based on a location of a hash value generated from identifiers of the block devices and/or snapshots in one of the hash value ranges. These hash value ranges may be maintained in the routing metadata and may be used by the router to determine the location of a particular resource within the active cells. In an example, the routing metadata specifies a type attribute usable to determine whether resources in the cells are being re-partitioned as a result of creation of new cells or as a result of a rollback scenario whereby partitioned resources are being returned to their original cells.

In an example, if the consensus routing metadata includes active metadata that indicates the current paths for all resources, the finite state machine is initiated by changing from the "started" state to the "active" state. To identify the location of the volume from which the snapshot is to be created, the router may use a hash value of an identifier of the volume and the hash value ranges specified in the routing metadata to determine which cell the snapshot should be created in. Based on the identified cell specified in the routing metadata, the router may transmit a request to the identified cell to generate the snapshot and fulfill the request. In an example, a request to the cell specifies a version number, which is usable to determine which version of the routing metadata is maintained by the cell. If the version number specified in the request matches the version number of the cell, the cell processes the request and generates the snapshot using the identified volume and other resources (e.g., prior snapshot generated using the volume).

In an example, the routing metadata can include active metadata and alternate metadata corresponding to an alternative state and migration of data between cells. For instance, an entry in the routing metadata may include a type attribute of "proposed," whereby this alternate metadata is used to determine the path for all new resources and represents the desired partitioned state upon successful migration of these resources. Additionally, the routing metadata may include an entry that includes a type attribute of "rollback," whereby this alternate metadata is used to determine the path for resources which were placed on newly provisioned cells based on metadata having a type attribute of "proposed." In an example, each entry in the routing metadata specified a version attribute. The version attribute, in an example, is a monotonically increasing integer that represents the version of the metadata. Metadata corresponding to an alternative state (e.g., "proposed" or "rollback") may have a higher version number than the active metadata. By way of example, "proposed" metadata may have a version number that is the next version after the version number of the active metadata. Further, "rollback" metadata may have a version number that is the next version after the version number of "proposed" metadata.

In an example, if the version number of cell receiving the request from the router is greater than the version number specified in the request, the cell returns an error message indicating that the version number specified by the router is stale and the version number maintained by the cell. The router, in response to the error message, utilizes the version number maintained by the cell to identify metadata corresponding to this version number. In an example, if the version number corresponds to metadata having a type attribute of "proposed," the finite state machine advances to the "proposed" state. In an example, each type attribute has a corresponding merit score, whereby "proposed" metadata may be assigned the greatest merit score, while "rollback" metadata may be assigned the lowest merit score. Thus, if the routing metadata results in two possible locations for the volume, snapshot, or other resources usable for generating a new snapshot, the router may utilize the metadata having the higher merit score to determine which cell is to be provided with the request to generate the new snapshot.

In an example, if the router utilizes the "proposed" metadata and receives a response from a cell indicating that the version number provided by the router is stale, the finite state machine transitions to the "rollback" state, causing the router to evaluate the active metadata and "rollback" metadata to determine the appropriate path for generating the snapshot of the volume. In an example, since the "rollback" metadata has a lower merit score than the active metadata, the router utilizes the active metadata to determine the path for the request. In an example, once migration of the resources has been completed, the finite state machine flips back to the "active" state. This may cause the router to also delete any alternate metadata from the routing metadata, leaving only the active metadata corresponding to the new version number maintained by the cells.

In this manner, routers of the block-level data storage service can utilize routing metadata maintained by the various cells to identify a location for creation of snapshots during partitioning of these cells. In addition, the techniques described and suggested herein facilitate additional technical advantages. For instance, because generation of a snapshot may be dependent upon previous snapshots of a volume, the use of routing tables in accordance with the techniques described above may prevent creation of corrupt snapshots in the wrong cell during partitioning of resources from one cell to another.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. Data content for snapshots of block devices of a cell may be stored in a set of hosts corresponding to the cell. Other cells may be generated based on a determination that the cell is 'hot', e.g., by virtue of the cell having a large number of associated mutation operations. Various operations involving data content and metadata may be performed in association with the cells using data content and metadata.

A block device 108 may be located in (e.g., assigned to) a first cell 104 of the system 100. A snapshot service for the first cell 104 may create, at a time $t_1$, a snapshot 110 of the block device 108, e.g., in response to receiving a request to generate a snapshot or in response to detection of some other predetermined event (e.g., a period of time has elapsed, a predetermined amount of data content generated for the first block device 108). Metadata 116 may be included in, or associated with, the snapshot 110 indicating information about the snapshot 110. The metadata 116 may include, by way of non-limiting example, a block identifier identifying the block device 108 from which the snapshot 110 was captured, a lineage level of the snapshot 110 (e.g., how many snapshots are in a chain of snapshots), identification information corresponding to the cell 104 of the snapshot 110, and family details of associated snapshots and/or block devices (e.g., version number, account identifier). The metadata 116 may comprise routing information usable to route data contents of the first block device 108 to and from a set of hosts 114 for storing and retrieving the data content. The routing information may include network location information for the set of hosts 114 (e.g., IP address, host address, physical location, network address information), memory address information of memory of the set of hosts 114, and any other appropriate location information. A routing layer of the snapshot service may use the routing information to transfer data contents from the corresponding block device, and/or to other hosts for creating snapshots.

In one embodiment, the block device 108 may be provided to a user of the service provider for use by one or more computer systems of the service provider. For example, the block device 108 may be exposed to virtual computing instances of the service provider such that the instances may use the block device 108 as a local storage device (e.g., a physical disk drive). In one embodiment, a block device 108 may be a logical storage space within (or allocated by) a data storage system in which data objects may be stored in either structured or unstructured (raw) form. The block device 108 may be identified by a volume identifier. Data for the block device 108 may reside in one physical storage device (e.g., a hard disk) or span across multiple storage devices, which may reside on a different system than that of the allocated block device 108. Data contents of the block device 108 may be modified by the service provider computer systems as a result of data storage operations performed thereon. The block device 108 may itself include several different types of data structures, and the block device may be entirely or only partially structured with such data structures. For example, the block device 108 may be variably manipulated, such as by a client device, to include several data structures in hierarchical form, such as partitions, logical volumes, file systems, directories, and files.

A "snapshot" may refer to a copy of a portion of a block device 108 taken at a particular point in time, or a copy of the entire block device 108 at a particular point in time. A snapshot may include, or have an association with, incremental data (which may also be referred to as a "change set") that includes data that is new or has changed since a previous snapshot was captured. The relationship between a current snapshot, $S_N$, and a previous snapshot, $S_P$, may be represented as $S_N = S_P + \Delta$, where $\Delta$ is a change in data content on the previous snapshot $S_P$—for example, data that is new or has changed in a block device 108 since a previous snapshot was captured. The previous snapshot $S_P$ may be an immediately preceding snapshot (i.e., $S_{N-1}$), or other previous snapshot generated reflecting a state of data content of a block device 108. Each of the snapshots illustrated may be captured at a different point in time, as described below in further detail.

A partitioning service of the service provider may partition a representation, including the data structures thereof, to optimize cost associated with modifying the relationships and migrating data associated with the data structures. The representation, which itself is an initial cell, may be partitioned into one or more cells 104, 106 where a given data structure in the representation, such as a block device, is assigned to a new cell and any future data structures generated therefrom are associated with that new cell. The cells 104, 106 correspond to a logical grouping of hosts distributed over a plurality of datacenters. As changes to a cell are made over time, computing resource usage may increase in association with modifications to relationships in the representation. For instance, mutation operations (e.g., data storage operations) may be performed to fulfill creation of new snapshots or modifications to existing snapshots initiated to back-up state changes in data content of the block device 108. These mutation operations, as described below, may have a high cost in terms of computing resources. To optimize resource utilization, the partition service may partition a cell 104 into a set of cells wherein the overall logical representation of the existing data structures remains the same, even after new cells are generated. For instance, the partitioning service may shard the cell 104 by distributing the data contents among a set of physical hosts located in one or more datacenter locations.

The partitioning of the cell 104 may be performed such that "hot" areas of the cell 104 (e.g., data structures having a concentration, or expected concentration based on one or more parameters attributable to the data structure or a related, e.g., predecessor, data structure, of associated mutating operations) are moved into a different cell 106. As described herein, "hotness" may refer to an observed or predicted concentration of mutation operations, such as capture of a new snapshot or incremental snapshot and/or the generation of a new volume/block device therefrom, associated with a data structure or set of data structures. As may be contemplated, different types of mutation operations may be associated with different amounts of computing resources for performing such operations (e.g., "cost"), and as such, may contribute differently to the overall hotness level. Partitioning may include allocating a new cell 106 separate from the existing cell, associating one or more data structures in the "hot" area of the existing cell with the new cell, and directing the system to assign, to the new cell(s) future data structures related to (e.g., generated from) the rellocated data structures. For instance, in an initial state of the representation, the partitioning service may detect one or more hot areas of the representation corresponding to one or more of the block device(s). Accordingly, the partition service may, for one or more of the hot areas, allocate one or more new cells; in this instance, cell 106. The partition service may then migrate and/or reallocate the block device(s) in the existing cell 104 to the new cell 106, resulting in a second state of the representation. The relationships between data structures represented in the first state are maintained in the second state such that a record is maintained for which data structures in the cell 104 correspond to which data structures in the new cell 106. Future relationships, such as new snapshot(s) 128, are associated with the respective new cell(s). In some embodiments, the process may repeat with respect to the new cells, as well as what remains of the initial cell.

Memory in the set of hosts 114 may be allocated for storage of data contents for data structures in the cell 104. For example, memory for the cell 104 may be reserved and assigned to the cell 104 for storing data content. The amount of memory may be changed to accommodate a need for data content. Such operations may be performed by an appropriate entity, such as the snapshot service, in response to determining a root node for a cell.

As a result of creation of the snapshot 110, the snapshot service may transfer (e.g., copy) data content from the block device 108 to the set of hosts 114. To capture a state of data content of the block device 108 at the time that the snapshot 110 was initiated, the snapshot service may transfer (e.g., copy), or cause transfer of, data chunks 112 from the block device 108 to the assigned memory of the set of hosts 114. The transfer of the data chunks 112 may take a period of time to complete due to, e.g., network bandwidth limitations. That is, the data chunks 112 may be transferred over a period of time $t_2$ after the time $t_1$. Transferring data chunks over time may represent a significant resource cost for the set of hosts 114. For example, generating an initial snapshot may include transferring the entire data content located, via data chunks 112 in a block device over the time period $t_1$. Creating an incremental snapshot may comprise transferring less than the entire data contents of the block device 108, but may also comprise obtaining metadata 116 for the block device 108.

The representation management service may monitor the resource usage associated with the first cell 104, cell $C_1$, and decide to partition the first cell 104. For instance, the representation management service may determine that the first cell 104 is 'hot' as a result of ascertaining that the resource cost associated with creating the initial snapshot 110 exceeds a predetermined threshold (e.g., mutation operations for the snapshot 110 generation exceed a predetermined mutation operations threshold). The representation management service may then create a second cell 106, which may include allocation of memory of a second set of hosts 122 for storage of data content of the block device 108. Although the second cell 106 is created, there may not initially be any data structured assigned to the second cell 106.

New data structures relating to the block device 108 that are initiated or created at a time $t_3$ after the second cell 106 is created are assigned to the second cell 106. For instance, a snapshot service may create, or initiate creation of, an incremental snapshot 118, $S_{21}$, of the block device 108 in the second cell 106 in response to, e.g., receiving a user request to generate a snapshot. The incremental snapshot 118 is a data content backup for a state of data content at the time $t_3$ at which the incremental snapshot 118 is created. As a result of creating the incremental snapshot 118, data chunks 120 of data content of the block device 108 may be transferred for backup to the set of hosts 122 over a period of time $t_4$ after the time $t_3$. The data chunks 120 are data content created on the block device 108 after the time $t_1$, or data content modified on the block device 108 after the time $t_1$. Transfer of the data chunks 120 from the block device 108 to the set of hosts 122 may occur over a period of time $t_4$ after the time $t_3$. The metadata 124 of the incremental snapshot 118 may include different information than the metadata 116 of the initial snapshot 110. For example, the metadata 124 may indicate location information of data content in the set of hosts 122 corresponding to a state of data content of the block device 108 at the time $t_3$ whereas the metadata 116 may indicate location information of data content in the set of hosts 114 corresponding to a state of data content of the block device 108 at the time $t_1$. In particular, the data content at the time $t_3$ may correspond to the data content that is different in the block device 108 at a time $t_1$ than at the time $t_1$ (e.g., new data content, modified data content). The metadata 124 may also indicate information regarding the metadata 116, such as location information or identification information of the metadata 116. Transfer of the data chunks 112 may be performed in parallel to the transfer of the data chunks 120 such that the time period $t_2$ may, at least in part, overlap with the time period $t_4$.

In an embodiment, a user requests to generate a new snapshot of a particular block device are received by a router 102 of the block-level data storage service. The router 102 is a computing device that transmits data from one network to computing devices in another network. Alternatively, the router 102 may be a software application or other application operating on a computing device of the block-level data storage service that replicates the functionality of a hardware-based (e.g., physical) communications network routing device. In some embodiments, the router 102 is a virtualized computing instance, or similar virtualized logical construct, that is instantiated on a computing device of the block-level data storage service or other service to implement the functionality of a hardware-based communications network routing device. The router 102 may maintain a finite state machine, which may be used to determine the operations that the router 102 is to perform in response to requests from users to create a snapshot of a particular block device, as well as to determine which cell authoritatively maintains data necessary for creating the snapshot. The finite state machine may be a mathematical model of computation, rendered as code executed by a processor or other hardware device of the router 102. In an embodiment, the finite state machine transitions into an "started" state in response to the router 102 becoming operational.

The router 102 may perform an asynchronous refresh of the metadata 116, 124 within the cells 104, 106. The router 102 may query each cell 104, 106 to obtain routing metadata 126 that specifies information usable by the router 102 to determine how to process requests to generate snapshots for a block device 108. In an embodiment, each entry in the routing metadata 126 specifies particular attributes that are used to determine how to route requests to generate a snapshot for a block device 108. For example, the routing metadata 126 may include a version attribute, which may be a monotonically increasing integer that represents the version of the routing metadata 126. In an embodiment, the version attribute starts at a value of zero when an initial entry is added to the routing metadata 126. An entry in the routing metadata 126 may also include a merit attribute, whereby each value corresponds to a particular metadata type (e.g., active, proposed, or rollback). The merit attribute may be used to determine the path to be used by the router 102 to route a request for creation of a snapshot. In an embodiment, rollback metadata, as described below, may have the lowest merit attribute value while proposed metadata may have the highest merit attribute value.

Each entry in the routing metadata 126 may also include a type attribute. The type attribute may be used by the router 102 to determine the type of metadata included in the particular entry. For example, a type attribute of "active" may correspond to active metadata usable to decide the path for all resources if no alternate metadata in the routing metadata 126 exists. A type attribute of "proposed" may correspond to proposed metadata usable to determine the path for all new resources and may also represent the desired partitioned state if migration of resources from one cell to another cell is successful. For instance, if the block-level data storage service identifies one or more "hot" areas within a cell, the block-level data storage service may allocate a new cell separate from the existing cell, and directing the partitioning system to assign, to the new cell future data structures related to the relocated data structures. If a new cell is created, the partitioning system may generate new metadata having a type attribute of "proposed," which may correspond to locations of data structures within the cells once migration (e.g., relocation) of the data structures has been completed. A type attribute of "rollback" may correspond to rollback metadata usable to determine the path for resources which were placed on new cells based at least in part on proposed metadata but that are to be returned to their original cell. For instance, if the block-level data storage service determines that the new cell, during migration, exhibits one or more "hot" areas, the block-level data storage service may cause the partitioning system to transfer any relocation data structures from the new cell to the original cell. The partitioning system may generate new metadata having a type attribute of "rollback," which may specify the locations of data structures within the cells according to the proposed metadata described above. However, these locations may be used by the partitioning system to identify which data structures are to be relocated from the new cell back to the original cell. Thus, in some instances, the locations specified in the proposed metadata and the rollback metadata may be identical.

In an embodiment, each entry in the routing metadata 126 also includes a range attribute. The range attribute may include a mapping of block device identifier hashes to cell identifiers. In response to a request to generate a snapshot for a particular block device, the router 102 may obtain a hash value corresponding to an identifier of the particular block device and utilize this hash value to determine a cell identifier corresponding to the cell where resources of the block device are located. In an embodiment, the range attribute for proposed metadata and for rollback metadata in the routing metadata 126 is the same. However, the range attribute in the rollback metadata may indicate reverse migration of resources from a new cell to the original cell from which the resources originated.

The router 102 may transmit a request to any cell to obtain the routing metadata 126. In an embodiment, the router 102 evaluates the routing metadata 126 to determine whether the routing metadata 126 includes active metadata (e.g., an entry having a type attribute of "active"). If the routing metadata 126 includes active metadata, the finite state machine advances to the "active" state. The router 102 may use the active metadata to determine where to route requests to create a snapshot of the block device 108. For instance, the router 102 may use the identifier of the block device 108 to identify the corresponding cell in which the snapshot 128 is to be created. The router 102 may submit a request to the identified cell to generate the snapshot 128. In an embodiment, the request specifies the version attribute value corresponding to the active metadata. In response to the request, the cell determines whether the enforced version for the cell is set to the same value as that specified in the request. If the version attribute values match, the cell processes the request and generates the snapshot 128 within the cell, as specified in the active metadata. If the version attribute values do not match (e.g., partitioning of the cell has begun), the cell may report an exception to the router 102 indicating that the version attribute value provided by the router 102 is now stale (e.g., not valid, expired, etc.).

In an embodiment, if the router 102 receives a stale version exception from the cell, the router 102 causes the finite state machine to advance to the "proposed" state. If the finite state machine is in the "proposed" state, the router 102 may evaluate active metadata and proposed metadata in the routing metadata 126 to determine which cell to transmit a request to generate a snapshot of a block device 108. For example, in response to a request to create a snapshot for block device 108, the router 102 may evaluate the range attributes for the active metadata and the proposed metadata in the routing metadata 126. If the router 102 determines that both the active metadata and the proposed metadata indicate that the resources corresponding to the hash of the block device identifier are in the same cell, the router 102 may transmit the request to the identified cell. This may result in the snapshot 128 being created within the identified cell, as specified in both the active metadata and proposed metadata.

However, if the router 102 determines that there is a conflict between the active metadata and the proposed metadata with regard to where the resources corresponding to the hash of the block device identifier are, the router 102 may use the merit attribute values for the active metadata and the proposed metadata to determine where the request should be transmitted. As noted above, proposed metadata may have a higher merit attribute value than the active metadata. Thus, the values specified in the proposed metadata may correspond to a high merit path while the values specified in the active metadata may correspond to a low merit path for path resolution purposes.

If the router 102 determines that multiple paths (e.g., possible cells) exist where the block device 108 and other resources may be located, the router 102 submits a path resolution request for both paths. In an embodiment, the router 102 submits a request to the cell corresponding to the low merit path (e.g., specified in the active metadata) to provide a response with regard to the status of the block device 108 within the cell (e.g., whether the block device 108 is present, whether the block device 108 is in a pre-create migrated state, and/or whether the block device 108 is in the process of being migrated). In an embodiment, for the low merit path, the request from the router 102 indicates that the value corresponding to the pre-create migrated state is to be set to "true" for any new resources created in response to the request (e.g., block device had not been previously created in the cell). Thus, if a cell receives the request from the router 102 and determines that the resource has not been created, the cell may create the resource and designate the resource as being in the pre-create migrated state (e.g., sets a metadata flag corresponding to a pre-create migrated state for the resource to "true"). For the high merit path, the router 102 may submit another request to the cell identified in the high merit path to provide a response with regard to the status of the block device 108. This request may indicate that the value for the pre-create migrated state is to be set to "false" for any new resources created in response to the request. Thus, if a cell receives this request from the router 102 and determines that the resource has not been created within the cell, the cell may create the resource and designate the resource as not being in the pre-create migrated state (e.g., sets a metadata flag correspond to a pre-create migrated state for the resource to "false").

The response from each cell 104, 106 may be a tuple with Boolean values corresponding to whether the resource is present in the cell, whether the resource exists in a pre-create migrated state, and whether the resource is in the process of being migrated. In response to these responses, the router 102 evaluates the responses against a truth table to determine which path to utilize for identifying the location of the block device 108 and, hence, for transmitting the request to generate a snapshot of the block device 108. The truth table may specify a set of rules corresponding to possible combinations of responses from the cells 104, 106. In an embodiment, the rules specified in the truth table correspond to outcomes that result in preservation of the lineage of snapshots created for the block device over time. For instance, if a cell corresponding to a lower merit value generates a block device in a pre-create migrated state, then, in the event of a catastrophic situation where a higher merit value cell is rendered unavailable, requests to generate a snapshot corresponding to this block device will fail instead of resulting in the creation of corrupt snapshots, thus preserving the lineage of snapshots. The truth table may, thus, specify one or more outcomes that result in the processing of requests to generate snapshots in cells that do not include a block device in a pre-create migrate state, further preserving the lineage of snapshots and preventing creation of corrupt snapshots. Based at least in part on the responses received from the cells 104, 106, the router 102 may identify the applicable rule within the truth table and determine the appropriate path for transmitting the request to generate the snapshot 128.

In an embodiment, if the block-level data storage system initiates a rollback of resources from cell 106 back to cell 104, the block-level data storage system updates metadata for cell 106 to change the version number of the cell. If the router 102 submits a request to the cell 106 to generate a new snapshot 128 and the request specifies a version number corresponding to the version attribute value of the proposed metadata, the cell 106 may return a stale version exception message. If the router 102 receives a stale version exception message from cell 106, the finite state machine may advance to the "rollback" state. As noted above, the routing metadata 126 may specify active metadata, proposed metadata, and rollback metadata. The proposed metadata and rollback metadata may be alternate metadata. The router 102 may evaluate the routing metadata 126 such that only the active metadata and the alternate metadata having the highest version attribute value are used. This causes the router 102 to evaluate the active metadata and the rollback metadata, as the rollback metadata may have a higher version attribute value than the proposed metadata.

The router 102 may use the range attribute values for the active metadata and the rollback metadata to determine which cell is to receive the request to generate the snapshot 128. As noted above, rollback metadata may have the lowest merit attribute value. Thus, the router 102 may transmit a low merit path request to the cell 106 identified in the rollback metadata to determine the status of the block device 108 within the cell 106. The router 102 may also transmit a high merit path request to the cell identified in the active metadata to determine the status of the block device 108 within the cell 104. The router 102 may receive responses from each of the cells 104, 106 and utilize the truth table to determine which cell is to receive the request to generate the snapshot 128 for the block device 108.

In an embodiment, if migration of the resources of the block level 108 is completed, the block-level data storage service updates the metadata for each cell 104, 106 to indicate a new version of the metadata. This new version of the metadata may correspond to new active metadata. The block-level data storage service may also delete any prior proposed metadata and rollback metadata from the routing metadata 126. Thus, when the router 102 receives this newly updated routing metadata 126, the router 102 may identify the new active metadata and cause the finite state machine to flip to the "active" state. Requests to generate a snapshot may be evaluated against the new active metadata and routed to the appropriate cell, accordingly.

Figure 2:
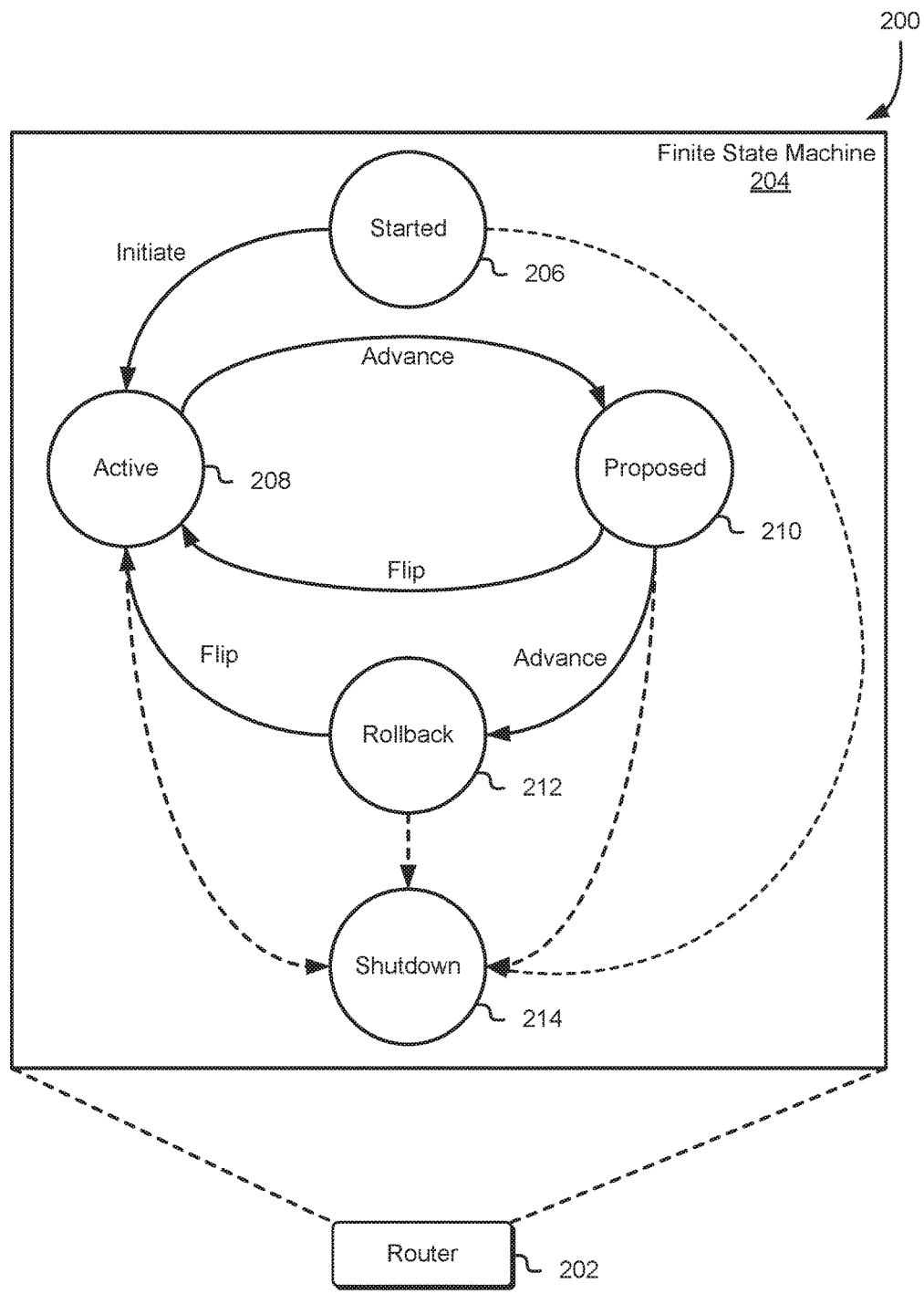
FIG. 2 shows an illustrative example of a system in which a router utilizes a finite state machine to identify actions to be performed for processing of requests to generate a snapshot of a volume in accordance with at least one embodiment.

FIG. 2 shows an illustrative example of a system 200 in which a router 202 utilizes a finite state machine 204 to identify actions to be performed for processing of requests to generate a snapshot of a volume in accordance with at least one embodiment. In the system 200, the router 202 initiates the finite state machine 204 as an initial operation upon activation by the block-level data storage service. The finite state machine 204, upon initiation, may enter into an "started" state 206. In the "started" state 206, the router 202 may query the various cells of the block-level data storage service to obtain routing metadata. In an embodiment, instead of querying each of the various cells for their respective routing metadata, the router 202 obtains consensus routing metadata from a metadata storage service of the block-level data storage service. The metadata storage service may comprise one or more computing devices that serve as a data repository for metadata of the block-level data storage service. The metadata storage service may aggregate metadata from the various cells to generate the consensus routing metadata. This consensus routing metadata may specify the current state of the cells of the block-level data storage service.

In an embodiment, the router 202 evaluates the routing metadata from the cells or from the metadata routing service and determines whether the routing metadata specifies active metadata. The active metadata may specify the location of block devices and snapshots within the cells and may be used to determine which cell is to receive a request to generate a snapshot of a block device if no alternate metadata (e.g., proposed or rollback metadata) is specified therein. If the router 202 determines that the routing metadata specifies active metadata, the finite state machine 204 advances to the "active" state 208.

In the "active" state 208, the router 202 may use the active metadata specified in the routing metadata to determine how to route requests from users of the block-level data storage service to generate snapshots of block devices or to generate block devices based at least in part on snapshots in the various cells. Requests to cells to generate a snapshot or new block device may specify a version attribute value corresponding to the version attribute value specified in the active metadata. If the version attribute value maintained by the target cell matches the version attribute value specified in the request, the cell may process the request and generate the snapshot or block device accordingly.

In an embodiment, the router 202 continues to query the various cells to obtain additional routing metadata. This additional routing metadata may include alternate metadata, such as proposed metadata and rollback metadata. This additional routing metadata may specify a new version attribute value that is greater than the version attribute value corresponding to the active metadata. However, this additional routing metadata may not be enforced by the router 202 until a request is received to generate a snapshot or block device in a cell that has provided this additional routing metadata. For instance, if the router 202 submits a request to a cell to generate a snapshot or block device within the cell, the cell may return a stale version exception response if the version attribute value maintained by the cell is greater than the version attribute value of the active metadata used by the router 202 to determine where to route the request.

If the router 202 receives a stale version exception response from a cell, the router 202 may transmit a notification to the finite state machine 204 to indicate the value of the stale version (e.g., the version attribute value of the active metadata) and the version attribute value provided by the cell. If the version attribute value provided by the cell matches the version attribute value of proposed metadata in the routing metadata, the finite state machine 204 advances to the "proposed" state 210. If the router 202 receives a request to generate a snapshot of a block device or to generate a new block device based at least in part on an existing snapshot, the router 202 may evaluate the active metadata and the proposed metadata to determine which cell has the requisite resources for fulfillment of the request. For instance, if the active metadata and the proposed metadata both indicate that the same cell has the resources necessary for fulfillment of the request, the router 202 may transmit the request to the cell. However, if the active metadata and the proposed metadata identify different cells that have the resources necessary for fulfillment of the request, the router 202 may perform a conflict resolution process to determine the cell that is to receive the request.

As noted above, proposed metadata may have a higher merit attribute value than active metadata, resulting in the proposed metadata specifying a high merit path for the processing of requests. If the request is to generate new resources, the router 202 may utilize the proposed metadata to determine in which cell these new resources will be generated. However, if the request is to generate a snapshot or a block device using existing resources, the router 202 may transmit a request to each cell specified in the active metadata and the proposed metadata as maintaining these existing resources. If the active metadata and proposed metadata specify that the same cell maintains the set of existing resources, the router 202 may determine that there are no conflicting paths and submit the request to the identified cell.

In an embodiment, in response to a request to generate a snapshot of a block device, the router 202 queries the routing metadata to identify the path for the block device. If the router 202 identifies multiple paths (e.g., more than one cell is identified), the router 202 submits a low merit path request to the cell identified in the active metadata that specifies that if the block device is to be created, it is to be created with a pre-create migrated flag set to a Boolean value of "true." Additionally, the router 202 submits a high merit path request to the cell identified in the proposed metadata that specifies that if the block device is to be created, it is to be created with a pre-create migrated flag set to a Boolean value of "false." Thus, for low merit path cells, requests to generate snapshots may fail instead of resulting in the creation of a corrupt snapshot.

As noted above, creation of a block device in pre-create migrated state in low merit path cells may be performed to prevent creation of corrupt snapshots in the event of a catastrophic event resulting in the unavailability of a high merit path cell. For instance, if a cell corresponding to a lower merit value generates a block device in a pre-create migrated state, then, in the event of a catastrophic situation where a higher merit value cell is rendered unavailable, requests to generate a snapshot corresponding to this block device will fail instead of resulting in the creation of corrupt snapshots, thus preserving the lineage of snapshots.

Each cell that receives either a low merit path request or a high merit path request may return a tuple response. This tuple response may specify a Boolean value for whether the resource is present within the cell, a Boolean value for whether the resource is in a pre-create migrated state, and a Boolean value for whether the resource is in a migrated state (e.g., in the process of being migrated to another cell). In an embodiment, in response to the tuple responses from the cells, the router 202 may evaluate the responses against a truth table to identify the appropriate path to be used to identify the cell that maintains the resources necessary for fulfillment of the request to generate a new snapshot or block device. The truth table may specify one or more outcomes that result in the processing of requests to generate snapshots in cells that do not include a block device in a pre-create migrate state, preserve the lineage of snapshots, and prevent creation of corrupt snapshots. In an embodiment, the truth table specifies, for each possible combination of tuple responses from the cells identified in the identified paths, a path resolution or actions that are to be undertaken by the router 202. For example, for a combination of tuple responses, the truth table may specify which path the router 202 is to utilize to identify which cell is to receive the request to generate a snapshot or block device. Alternatively, for another combination of tuple responses, the truth table may specify that there is no resolution and that there is an error within the system. This may cause the router 202 to return an error message to the requestor. Yet another combination of tuple responses specified in the truth table may result in an indication that the router 202 is to submit the high merit path and low merit path requests again at a later time. Thus, in the "proposed" state 210, the router 202 may submit requests to cells identified in the active metadata and proposed metadata to identify the location of resources necessary for creating a snapshot or block device.

In an embodiment, if migration is completed in accordance with the proposed metadata, the block-level data storage service updates the routing metadata for each cell to indicate the new active state for each cell. The block-level data storage service may delete any alternate metadata from the routing metadata maintained within the cells. The router 202 may obtain this new routing metadata from the cells and, if the new routing metadata does not include any alternate metadata, the router 202 may cause the finite state machine 204 to flip from the "proposed" state to the "active" state 208. Thus, the router 202 may utilize the active metadata from the routing metadata to determine how to route requests to generate snapshots or block devices.

In the event that the block-level data storage service determines that a rollback of resources that were migrated to a new cell is needed, the block-level data storage service may update the routing metadata to include new alternate metadata corresponding to a type attribute value of "rollback." Further, the version attribute value of the rollback metadata may be greater than that of the proposed metadata or active metadata specified in the routing metadata. Thus, if the router 202 submits a request to a cell to generate a snapshot of a block device or to generate a new block device, the router 202 may receive another stale version exception response from the cell. This particular request may specify the version attribute value of the proposed metadata. Thus, if the finite state machine 204 determines that the version attribute value corresponds to rollback metadata, the finite state machine 204 advances from the "proposed" state 210 to the "rollback" state 212.

In the "rollback" state 212, the router 202 may process incoming requests for generating snapshots or block devices using a similar process to that described above in connection with the "proposed" state 210. However, in the "rollback" state 212, the router 202 may ignore the proposed metadata from the routing metadata and utilize the active metadata and the rollback metadata to determine which cell is to receive the request to generate the snapshot or block device. Further, as opposed to proposed metadata, which may have a higher merit attribute value than active metadata, the rollback metadata may have a lower merit attribute value than the active metadata. Thus, the router 202 submits a low merit path request to the cell identified in the rollback metadata that specifies that if the block device is to be created, it is to be created with a pre-create migrated flag set to a Boolean value of "true." Additionally, the router 202 submits a high merit path request to the cell identified in the active metadata that specifies that if the block device is to be created, it is to be created with a pre-create migrated flag set to a Boolean value of "false." Based at least in part on the responses from the cells, and the rules specified in the truth table, the router 202, while in the "rollback" state 212, may determine which cell to route the request for creation of a snapshot or block device.

In an embodiment, if migration is completed in accordance with the rollback metadata, the block-level data storage service updates the routing metadata for each cell to indicate the new active state for each cell. The block-level data storage service may delete any alternate metadata from the routing metadata maintained within the cells. The router 202 may obtain this new routing metadata from the cells and, if the new routing metadata does not include any alternate metadata, the router 202 may cause the finite state machine 204 to flip from the "rollback" state 212 to the "active" state 208.

In some instances, the finite state machine 204 may transition from any state to a "shutdown" state 214. Transition to the "shutdown" state 214 may occur if the router 202 is rendered inoperative by the block-level data storage service or as a result of an event (e.g., power outage, damage to the router 202, etc.). In the "shutdown" state 214, the router 202 may not process requests to generate snapshots or block devices. Further, the finite state machine 204 may remain in the "shutdown" state 214 until the router 202 is reinitialized for use.

Figure 3:
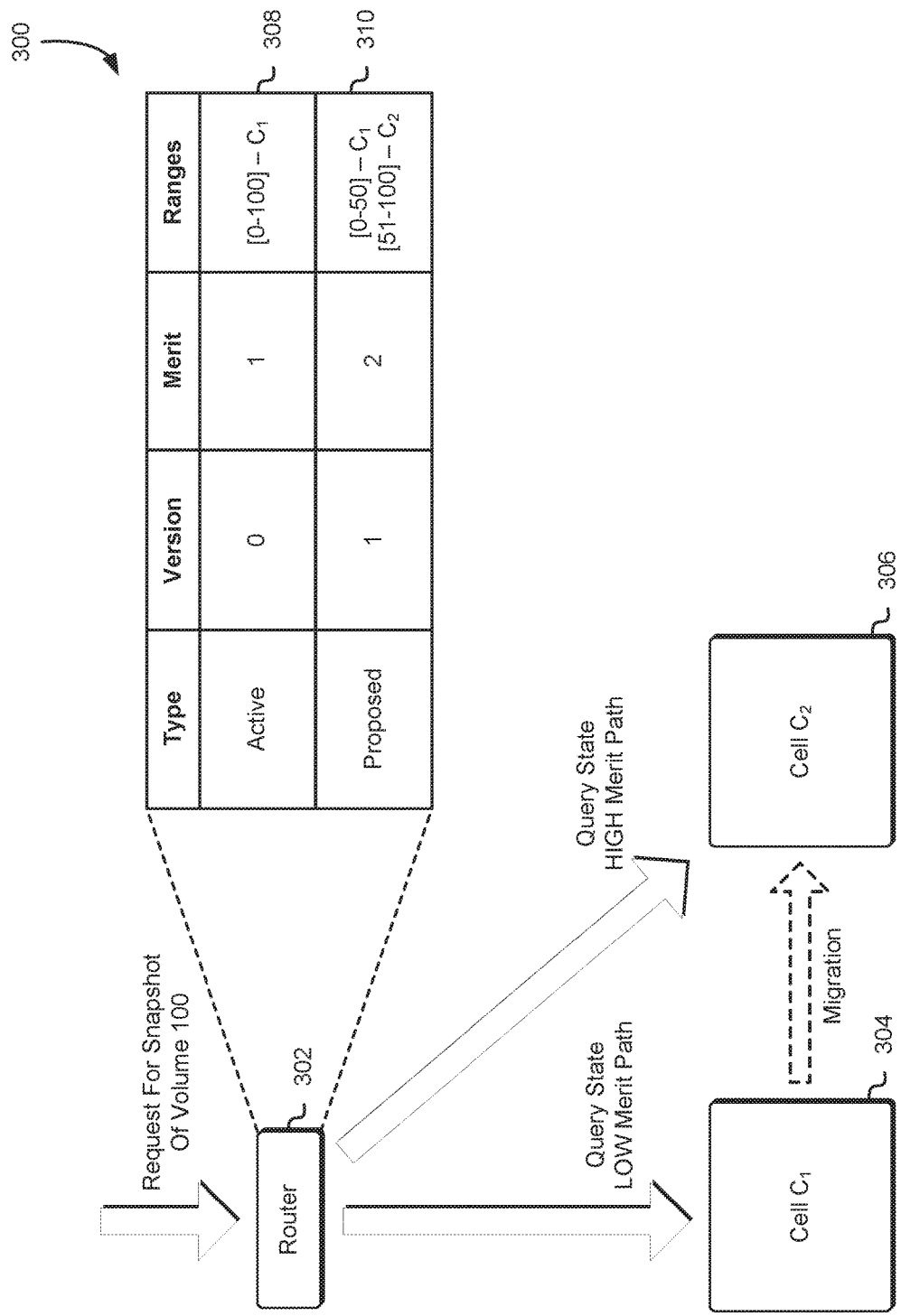
FIG. 3 shows an illustrative example of a system in which a router transmits low and high merit path requests for resource state information based at least in part on active metadata and proposed metadata in accordance with at least one embodiment.

FIG. 3 shows an illustrative example of a system 300 in which a router 302 transmits low and high merit path requests for resource state information based at least in part on active metadata 308 and proposed metadata 310 in accordance with at least one embodiment. In the system 300, the router 302 receives a request from a user of the block-level data storage service to generate a snapshot for a block device (e.g., volume having an identifier hash of 100, as illustrated in FIG. 3). In response to the request, the router 302 may utilize the identifier of the specified block device to obtain a hash value. This hash value may be used to identify in which cell the block device is located.

As illustrated in FIG. 3, the router 302 may be in a "proposed" state, whereby the router 302 may evaluate active metadata 308 and proposed metadata 310 from the routing metadata obtained from cells 304, 306 or from a metadata storage service. In the "proposed" state, resources may be migrated or in the process of being migrated from cell 304 to cell 306. Thus, the router 302 may evaluate the active metadata 308 and the proposed metadata 310 from the routing metadata to determine which cell maintains the block device and, thus, is to receive the request to generate a snapshot of the block device. In an embodiment, the router 302 evaluates the range attribute values of both the active metadata 308 and the proposed metadata 310 to determine which cell corresponds to the hash value obtained by the router 302 based at least in part on the identifier of the block device specified in the request.

If the active metadata 308 and the proposed metadata 310 indicate that the hash value corresponds to the same cell, the router 302 may transmit a request to the identified cell to generate a snapshot of the block device specified by the user. However, if, as illustrated in FIG. 3, the hash value corresponds to different cells in the active metadata 308 and the proposed metadata 310 (e.g., cell 304 and cell 306, respectively), the router 302 may determine that multiple paths exist for determining the location of the block device (e.g., more than one cell is identified as possibly maintaining the block device). If the router 302 determines that multiple paths are available for determining the location of the block device, the router 302 may utilize the merit attribute values of the active metadata 308 and the proposed metadata 310 to determine authoritatively which cell currently maintains the block device.

As noted above, proposed metadata may have a higher merit attribute value than active metadata. Thus, if the active metadata 308 specifies that the block device is located in cell 304, the router 302 may transmit a low merit path query to cell 304 to obtain a tuple response regarding the block device. The tuple response from cell 304 may indicate a state of the block device within cell 304. Further, if the proposed metadata 310 specifies that the block device is located in cell 306, the router 302 may transmit a high merit path query to cell 306 to obtain a tuple response regarding the block device. The tuple response from cell 306 may indicate a state of the block device within cell 306. The low merit path query to cell 304 may specify that if the block device is to be created within cell 304, it is to be created with a pre-create migrated flag set to a Boolean value of "true." A block device in a pre-create migrated state (e.g., pre-create migrated flag set to "true") may be considered a dummy block device that cannot be utilized for the creation of snapshots. This dummy block device may also serve as an indication to the set of hosts of the cell that requests to generate snapshots for the block device within the cell are to be rejected. Additionally, the high merit path request to cell 306 may specify that if the block device is to be created within 306, it is to be created with a pre-create migrated flag set to a Boolean value of "false." Thus, for cells identified as being in the low merit path according to the routing metadata, requests to generate snapshots may fail instead of resulting in the creation of a corrupt snapshot as the hosts of these cells may determine, as a result of the block device being in a pre-create migrated state, that a snapshot cannot be created for the block device.

Figure 4:
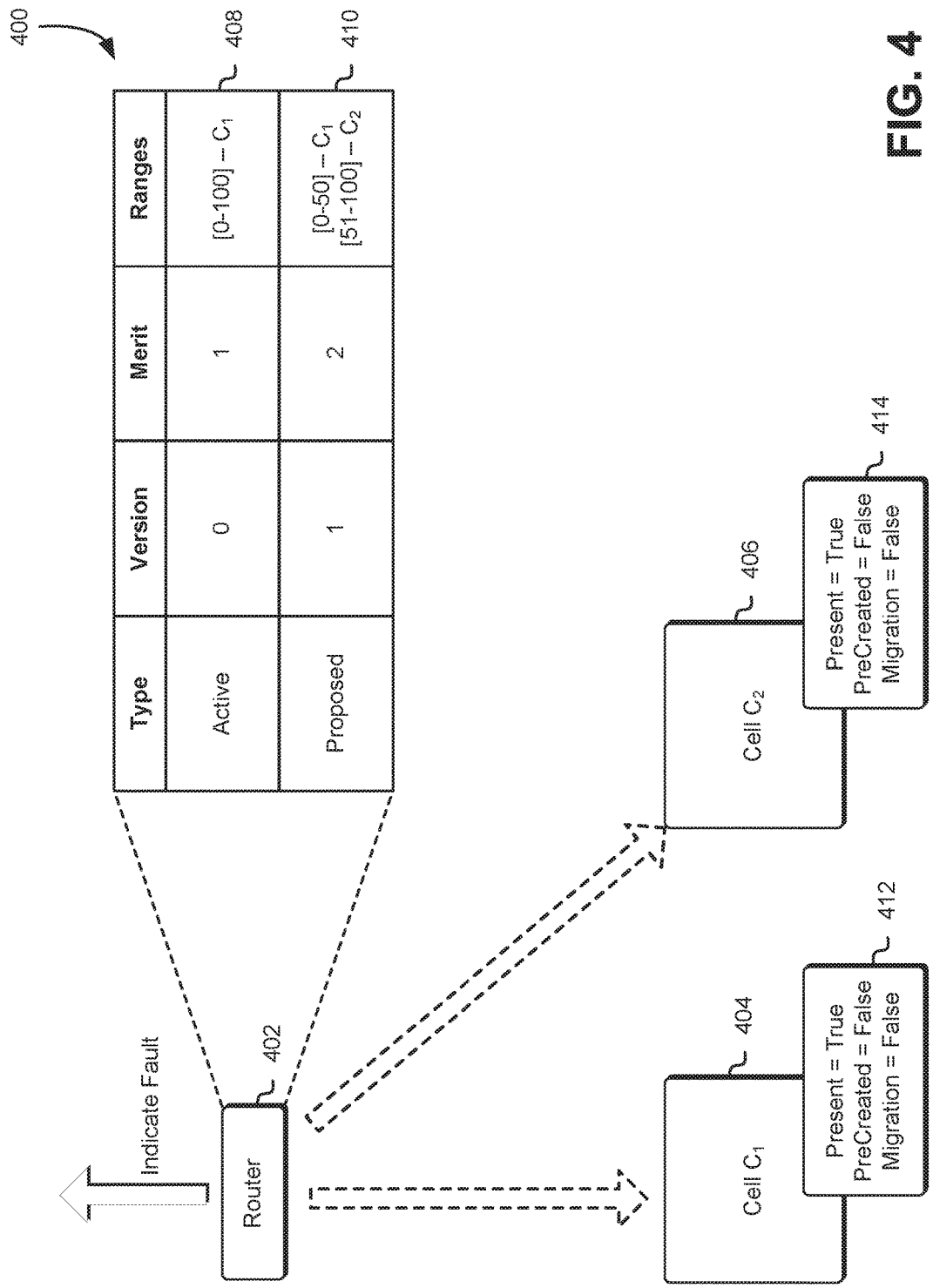
FIG. 4 shows an illustrative example of a system in which a router indicates a fault based at least in part on responses from cells and a corresponding rule from a truth table in accordance with at least one embodiment.

Each cell that receives either a low merit path query or a high merit path query may return a tuple response. This tuple response may specify a Boolean value for whether the block device is present within the cell, a Boolean value for whether the block device is in a pre-create migrated state, and a Boolean value for whether the block device is in a migrated state (e.g., in the process of being migrated to another cell). In an embodiment, in response to the tuple responses from the cells, the router may evaluate the responses against a truth table to identify the appropriate path to be used to identify the cell that maintains the resources necessary for fulfillment of the request to generate a new snapshot or block device. In some instances, these responses may result in the router determining that there is a fault among the cells. This may cause the router to reject the request and to notify the user that an error was detected, resulting in failure to fulfill the request. This may prevent creation of corrupt snapshots in these cells and preserve the lineage of existing snapshots. Accordingly, FIG. 4 shows an illustrative example of a system 400 in which a router 402 indicates a fault based at least in part on responses from cells 404, 406 and a corresponding rule from a truth table in accordance with at least one embodiment.

In the system 400, the router 402 may receive a tuple response 412 from cell 404 and a tuple response 414 from cell 406. Cells 404, 406 may be identical to cells 304, 306 described above in connection with FIG. 3. Further, the tuple responses 412, 414 may be provided in response to the low merit path request and the high merit path request submitted by the router 402 to cell 404 and cell 406, respectively and in accordance with the active metadata 408 and proposed metadata 410. As illustrated in FIG. 4, the tuple response 412 indicates that the block device is present in cell 404 (e.g., Boolean value for whether the block device is present is set to "True"), that the block device is not in a pre-create migrated state (e.g., Boolean value for whether the block device is in a pre-create migrated state within the cell 404 is set to "False"), and the block device is not in the process of being migrated to cell 406 (e.g., Boolean value for whether migration has commenced or has been performed for the block device is set to "False"). Thus, the router 402, based at least in part on tuple response 412, may determine that the block device is present within cell 404 and is not in the process of being migrated. Further, as illustrated in FIG. 4, the router 402 receives a tuple response 414 from cell 406 that indicates that the block device is present in cell 406 but that the block device is not in the process of being migrated to cell 404 or in a pre-create migrated state.

In an embodiment, the router 402 evaluates the tuple responses 412, 414 against a truth table to identify a rule corresponding to the Boolean values presented in the tuple responses 412, 414. As described in greater detail below, if both cells 404, 406 indicate, in their respective tuple responses 412, 414, that they each maintain the block device and that the block device is not in the process of being migrated and is not in a pre-create migrated state, the truth table may specify that there is an error present within the block-level data storage service, as a block device may not exist in two cells simultaneously without a cell reporting that the block device is in a state of migration. Thus, the router 402, based at least in part on the resolution specified in the truth table corresponding to the tuple responses 412, 414 received from the cells 404, 406, may transmit a notification to the user indicating that a fault was detected and, as a result, the request could not be fulfilled.

Figure 5:
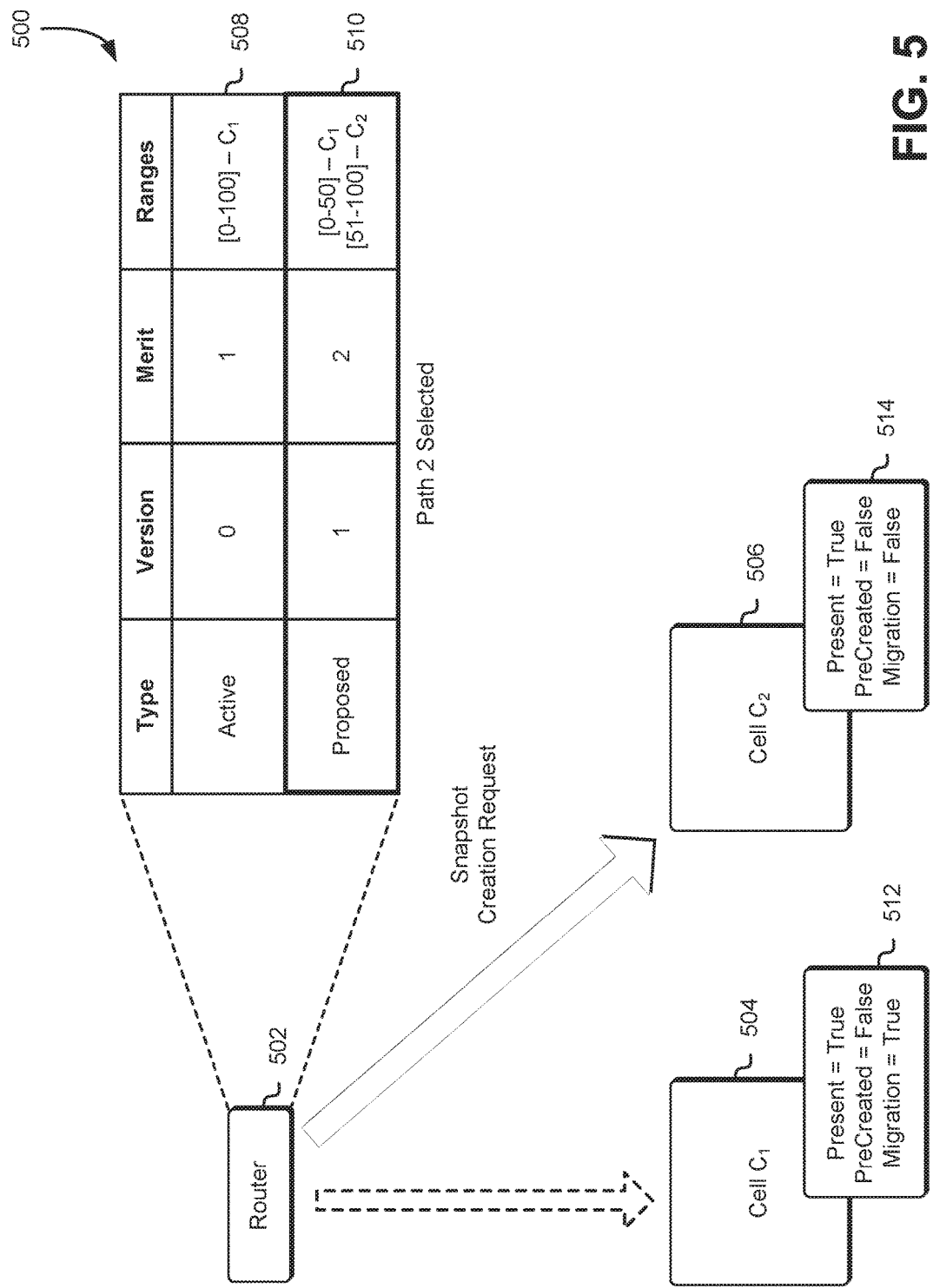
FIG. 5 shows an illustrative example of a system in which a path corresponding to proposed metadata is used by a router based at least in part on responses from cells and a corresponding rule from a truth table in accordance with at least one embodiment.

In some instances, while each cell may provide a tuple response indicating that the block device exists within the cell, one cell may also denote that the block device is in a state of migration to another cell. This may result in the invocation of a different rule from the truth table, which may cause the router to select a path corresponding to the authoritative location of the block device and to where the request for creation of a snapshot is to be directed. Accordingly, FIG. 5 shows an illustrative example of a system 500 in which a path corresponding to proposed metadata 510 is used by a router 502 based at least in part on responses from cells and a corresponding rule from a truth table in accordance with at least one embodiment.

In the system 500, the router 502 obtains a tuple response 512 from cell 504 indicating that a block device specified in a request received by the router 502 to create a snapshot of the block device is present in the cell 504 and that the block device is in a state of migration to cell 506. The request to obtain the tuple response 512 from cell 504 may be transmitted by the router 502 to cell 504 based at least in part on a determination that the active metadata 508 specifies that the block device is present in cell 504. As noted above, if the finite state machine of the router 502 is in a "proposed" state, the active metadata 508 may correspond to a low merit path. Thus, the request for the tuple response 512 from cell 504 may indicate that if the block device is to be created in the cell 504, it is to be created with a pre-create migrated flag set to "true." However, as illustrated in FIG. 5, the block device may already exist in the cell 504, resulting in a pre-create migrated Boolean value in the tuple response 512 being set to "false."

The router 502 may also obtain a tuple response 514 from cell 506 indicating that the block device specified in the request received by the router 502 to create a snapshot of the block device is present in cell 506 but is not in a state of migration to cell 504 and that a flag for the block device has not been set to indicate that it is in a pre-create migrated state. The request to obtain the tuple response 514 from cell 506 may be transmitted by the router 502 to cell 506 based at least in part on a determination that the proposed metadata 510 specifies that the block device is present in cell 506. As noted above, if the finite state machine of the router 502 is in a "proposed" state, the proposed metadata 510 may correspond to a high merit path. Thus, the request for the tuple response 514 from cell 506 may indicate that if the block device is to be created in the cell 506, it is to be created with a pre-create migrated flag set to "false."

The router 502 may evaluate the tuple responses 512, 514 using a truth table. For instance, the router 502 may use the Boolean values specified in each tuple response to identify a corresponding rule applicable to the responses. As illustrated in FIG. 5, the router 502 may determine, based at least in part on the tuple responses 512, 514 and the truth table, that the proposed metadata 510 provides the authoritative path for the request to generate the snapshot of the block device. Thus, based at least in part on the proposed metadata 510, the router 502 may transmit a request to cell 506 to generate the snapshot of the block device, as the block device may be present in cell 506 and not subject to migration to cell 504.

Figure 6:
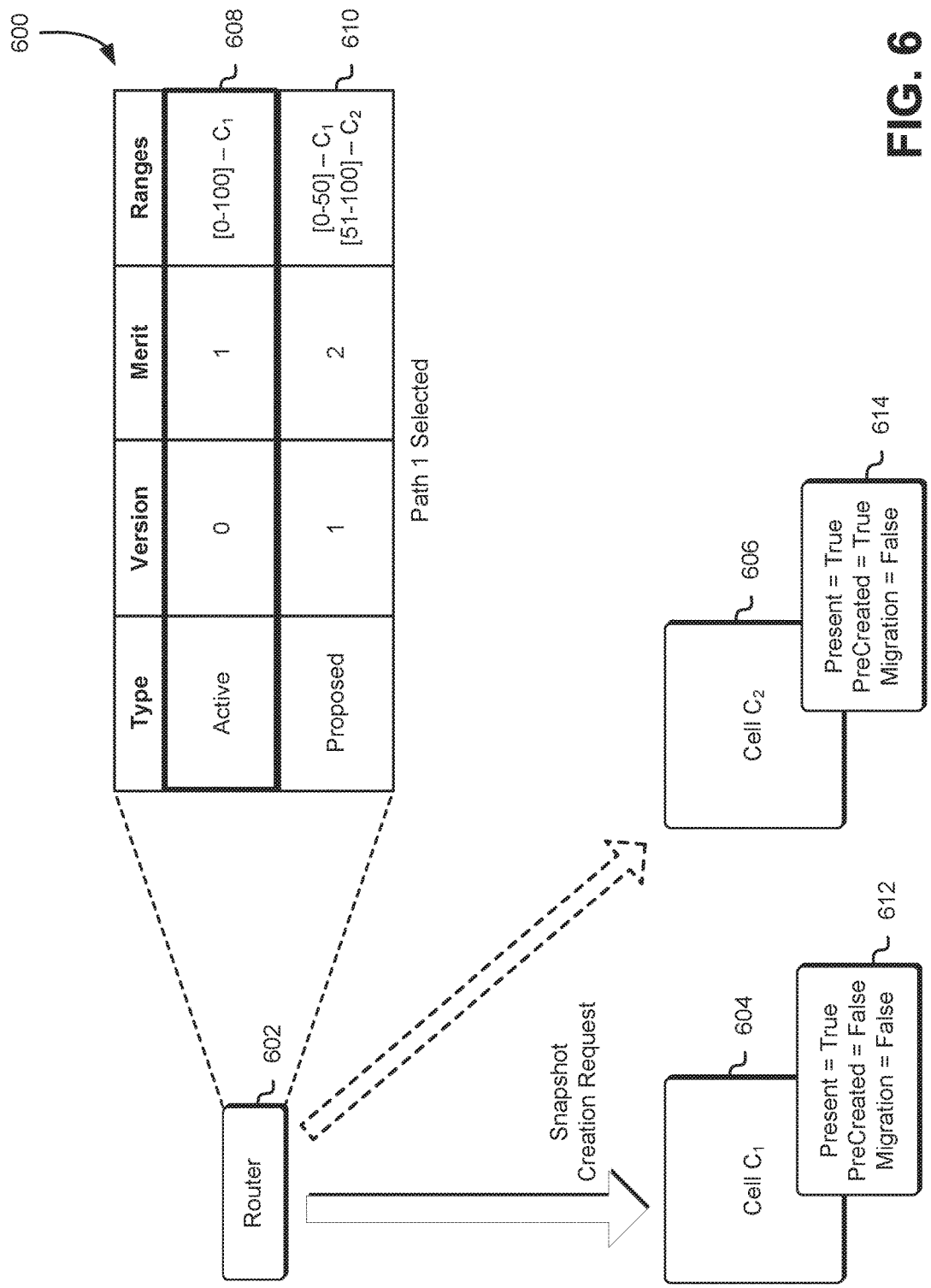
FIG. 6 shows an illustrative example of a system in which a path corresponding to active metadata is used by a router based at least in part on responses from cells and a corresponding rule from a truth table in accordance with at least one embodiment.

In some instances, while proposed metadata may indicate that a block device is located within a particular cell, this block device may have been migrated, or is in the process of being migrated, to another cell. Under such circumstances, the proposed metadata may not provide the authoritative location of the block device. This may be reflected in the tuple responses from the cells, which may result in the router selecting a path specified via the active metadata in the routing metadata. Accordingly, FIG. 6 shows an illustrative example of a system 600 in which a path corresponding to active metadata 608 is used by a router 602 based at least in part on responses from cells 604, 606 and a corresponding rule from a truth table in accordance with at least one embodiment.

In the system 600, the router 602 obtains a tuple response 612 from cell 604 indicating that a block device specified in a request received by the router 602 to create a snapshot of the block device is present in the cell 604 and that the block device is not in a state of migration to cell 606. The request to obtain the tuple response 612 from cell 604 may be transmitted by the router 602 to cell 604 based at least in part on a determination that the active metadata 608 specifies that the block device is present in cell 604. Similar to the system 500 described above in connection with FIG. 5, if the finite state machine of the router 602 is in a "proposed" state, the active metadata 608 may correspond to a low merit path. Thus, the request for the tuple response 612 from cell 604 may indicate that if the block device is to be created in the cell 604, it is to be created with a pre-create migrated flag set to "true." However, as illustrated in FIG. 6, the block device may already exist in the cell 604, resulting in a pre-create migrated Boolean value in the tuple response 612 being set to "false."

The tuple response 614 from cell 606 may specify that the block device specified in the request received by the router 602 to create a snapshot of the block device is present in cell 606 but that a flag for the block device has been set to indicate that it is in a pre-create migrated state. The request to obtain the tuple response 614 from cell 606 may be transmitted by the router 602 to cell 606 based at least in part on a determination that the proposed metadata 610 specifies that the block device is present in cell 606. As noted above, if the finite state machine of the router 602 is in a "proposed" state, the proposed metadata 610 may correspond to a high merit path. Thus, the request for the tuple response 614 from cell 606 may indicate that if the block device is to be created in the cell 606, it is to be created with a pre-create migrated flag set to "false." However, since the block device already exists in the cell 606 in a pre-create migrated state, the indication in the request may not apply. As noted above, a block device in a pre-create migrated state may correspond to a dummy block device that cannot be used for the generation of snapshots. Snapshots are created incrementally based at least in part on previously created snapshots of a block device. Thus, if access to data in the new cell is lost, access to these previously created snapshots may also be lost. Creating a new snapshot for the block device may, thus, result in the creation of a corrupt snapshot. The pre-create migrated state for a block device is used to prevent the creation of corrupt snapshots in the event of a rollback from a new cell to an original cell. For instance, in the event of a catastrophic event (e.g., the new cell suddenly is unable to process requests, etc.), partitioning to the new cell is rolled back such that access to data in the new cell is lost. At this stage, requests targeting this block device may be transmitted to the original cell, where the requests will fail due to the block device being in a pre-create migrated state.

In response to receiving the tuple responses 612, 614 from the cells 604,606, the router 602 may evaluate the tuple responses 612, 614 using a truth table to identify the appropriate path for the request to generate a snapshot of the block device. The truth table, as will be described in greater detail below, may indicate that the router 602 may utilize the path corresponding to the active metadata 608, as the tuple response 612 indicates that the block device is present in cell 604, as specified in the active metadata 608, while the tuple response 614 indicates that the block device is in a pre-create migrated state in cell 606. Thus, the router 602 may utilize the path described in the active metadata 608 and determine that the request to generate the snapshot of the block device is to be transmitted to cell 604. The router 602 may transmit the request to cell 604, which may generate the snapshot of the block device within cell 604.

Figure 7:
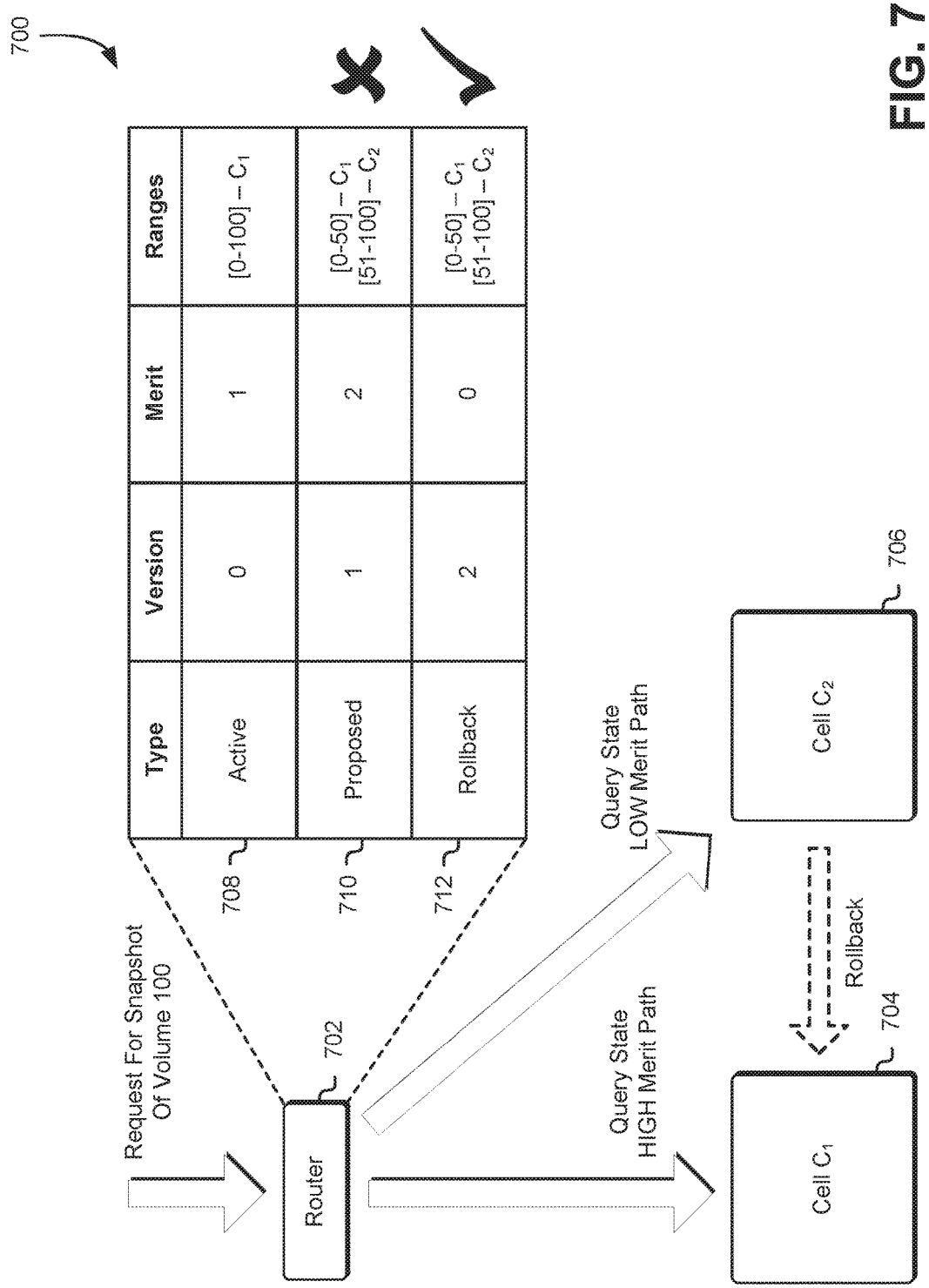
FIG. 7 shows an illustrative example of a system in which a router transmits low and high merit path requests for resource state information based at least in part on active metadata and rollback metadata in accordance with at least one embodiment.

As noted above, if the routing metadata specifies active metadata and both proposed metadata and rollback metadata, the router may utilize the active metadata and the rollback metadata to determine the routing path for requests to generate snapshots of block devices. For instance, if the router submits a request to a cell to generate a snapshot of a block device or to generate a new block device, the router may receive a stale version exception response from the cell. This particular request from the router may specify the version attribute value of the proposed metadata. Thus, if the finite state machine determines that the version attribute value corresponds to rollback metadata, the finite state machine advances from the "proposed" state to the "rollback" state. This may cause the router to process requests according to the active metadata and the rollback metadata specified in the routing metadata. Accordingly, FIG. 7 shows an illustrative example of a system 700 in which a router 702 transmits low and high merit path requests for resource state information based at least in part on active metadata 708 and rollback metadata 712 in accordance with at least one embodiment.

In the system 700, the finite state machine of the router 702 may be in a "rollback" state in response to a stale version exception response from a cell. If the router 702 receives a request from a user to generate a snapshot corresponding to a block device (e.g., volume having an identifier hash of 100), the router 702 may evaluate the routing metadata to determine where the block device may be located among cells 704, 706. In an embodiment, the routing metadata includes active metadata 708, proposed metadata 710, and rollback metadata 712. The rollback metadata 712 may be similar to the proposed metadata 710 except with differing merit attribute values and version attribute values. For instance, since a rollback state corresponds to resources previously being migrated to a cell being returned to their original cells, the rollback metadata 712 may have a higher version attribute value than the proposed metadata 710. This may correspond to the stale version exception response provided by a cell in response to a request from the router 702 while the router 702 is in a "proposed" state, whereby the router 702 utilizes the active metadata 708 and the proposed metadata 710.

In the "rollback" state, resources may be migrated or in the process of being migrated from cell 706 to cell 704. Thus, the router 702 may evaluate the active metadata 708 and the rollback metadata 712 from the routing metadata to determine which cell maintains the block device and, thus, is to receive the request to generate a snapshot of the block device. In an embodiment, the router 702 evaluates the range attribute values of both the active metadata 708 and the rollback metadata 712 to determine which cell corresponds to the hash value obtained by the router 702 based at least in part on the identifier of the block device specified in the request. The proposed metadata 710 may be rendered dormant by the router 702, resulting in the proposed metadata 710 not being used for determining the path for routing requests to generate snapshots of block devices while the router 702 is in the "rollback" state.

If the active metadata 708 and the rollback metadata 712 indicate that the hash value corresponds to the same cell, the router 702 may transmit a request to the identified cell to generate a snapshot of the block device specified by the user. However, if, as illustrated in FIG. 7, the hash value corresponds to different cells in the active metadata 708 and the rollback metadata 712 (e.g., cell 304 and cell 306, respectively), the router 702 may determine that multiple paths exist for determining the location of the block device (e.g., more than one cell is identified as possibly maintaining the block device). If the router 702 determines that multiple paths are available for determining the location of the block device, the router 702 may utilize the merit attribute values of the active metadata 708 and the rollback metadata 712 to determine authoritatively which cell currently maintains the block device. As noted above, rollback metadata may have a lower merit attribute value than active metadata. Thus, if the active metadata 708 specifies that the block device is located in cell 704, the router 702 may transmit a high merit path request to cell 704 to obtain a tuple response regarding the block device. Further, if the rollback metadata 712 specifies that the block device is located in cell 706, the router 702 may transmit a low merit path request to cell 706 to obtain a tuple response regarding the block device.

As noted above, if the router is in a "proposed" or "rollback" state, the router may evaluate active metadata and alternate metadata (e.g., proposed metadata or rollback metadata) to determine how to route requests to generate snapshots of block devices. If evaluation of the active metadata and alternate metadata results in multiple paths for routing requests to generate these snapshots, the router may use the active metadata and the alternate metadata to identify the high merit value path and the low merit value path. The router may transmit requests to the cells in accordance with which path each cell corresponds to in order to obtain tuple responses. These tuple responses may indicate whether a block device is present in the cell, whether the block device is in a pre-create migrated state, and whether the block device is in the process of being migrated to another cell. The router may evaluate these tuple responses using a truth table to determine whether the request can be processed and, if so, which path is to be used to identify the cell that is to receive the request to generate the snapshot of the block device. Accordingly, FIG. 8 shows an illustrative example of a truth table 800 usable to determine a set of actions to be performed by the router based at least in part on responses from cells in accordance with at least one embodiment.

In an embodiment, the truth table 800 includes an entry for each rule 802-832 corresponding to a possible combination of tuple responses from cells identified via path in the routing metadata. The paths identified in the truth table 800 may each correspond to a high merit path or low merit path identified by the router. In some instances, the first path (e.g., "Path 1" specified in the truth table 800) may correspond to a path specified via the active metadata and the second path (e.g., "Path 2" specified in the truth table 800) may correspond to a path specified via the alternate metadata (e.g., proposed metadata or rollback metadata) of the routing metadata. In an embodiment, the truth table 800 is used by the router if evaluation of the active metadata and the alternate metadata results in the identification of multiple possible paths for routing a request to generate a snapshot of a block device. In an embodiment, the rules specified in the truth table 800 correspond to outcomes that result in preservation of the lineage of snapshots created for a particular block device over time. For instance, if a cell corresponding to a lower merit value path generates a block device in a pre-create migrated state, then, in the event of a catastrophic situation where a cell corresponding to a higher merit value path is rendered unavailable, requests to generate a snapshot corresponding to this block device will fail instead of resulting in the creation of corrupt snapshots, thus preserving the lineage of snapshots for the block device. The truth table 800 may, thus, specify one or more outcomes that result in the processing of requests to generate snapshots in cells that do not include a block device in a pre-create migrate state, further preserving the lineage of snapshots and preventing creation of corrupt snapshots.

A router may transmit a request to each cell identified using the routing metadata to provide a status with regard to a particular block device. For instance, the request may cause a cell to specify whether the block device is present in the cell. Further, the request may cause the cell to specify, if the block device is present in the cell, whether the block device has been created in a pre-create migrated state or otherwise exists in the cell in a pre-create migrated state. The pre-create migrated state for a block device is used to prevent the creation of corrupt snapshots in the event of a rollback from a new cell to an original cell. For instance, in the event of a catastrophic event (e.g., the new cell suddenly is unable to process requests, etc.), partitioning to the new cell is rolled back such that access to data in the new cell is lost. At this stage, requests targeting this block device may be transmitted to the original cell, where the requests will fail due to the block device being in a pre-create migrated state. This may cause the block-level data storage service to mark the block device as full. If a block device is full, the next snapshot of the block device may be complete, preventing corruption or inconsistency within the system. In an embodiment, requests to cells corresponding to a low merit path may cause these cells to create a block device in a pre-create migrated state if the block device has not been previously created within these cells. Requests to each cell identified using the routing metadata may also cause each cell to specify whether the block device, if present, is in a state of migration to another cell.

In an embodiment, responses from the cells are provided in the form of tuples, whereby a tuple provides a Boolean value for whether the specified block device is present within the corresponding cell, a Boolean value for whether the specified block device is in a pre-create migrated state, and a Boolean value for whether the specified block device is in the process of being migrated to another cell. Each Boolean value may either be set to "true" or "false." It should be noted that while tuple responses and Boolean values are used extensively throughout the present disclosure for the purpose of illustration, responses from the cells may be provided in any format that is usable by the router to determine the state of block devices within these cells.

The truth table 800 may include a rule 802 corresponding to a combination of a tuple response of a first cell indicating that the block device is present within the first cell and a tuple response of a second cell indicating that the block device is present within the second cell. The rule 802 may indicate that, for this combination of tuple responses, the router is to indicate a fault in the partitioning system. For instance, the rule 802 may serve as an indication that a block device cannot exist in multiple cells at the same time without one cell indicating that the block device is in a state of migration to another cell or that a block device within a cell is in a pre-create migrated state. If rule 802 is invoked based at least in part on the tuple responses obtained by the router, the router may transmit a notification to the user indicating that its request to generate a snapshot of a block device could not be fulfilled due to this fault.

The truth table 800 may further include a rule 804 corresponding to a combination of a tuple response of a first cell indicating that the block device is present within the first cell and a tuple response of a second cell indicating that the block device, while present in the second cell, is in a state of migration to the first cell. The rule 804 may indicate that, for this combination of tuple responses, the router is to transmit requests to generate snapshots of the block device in accordance with the first path (e.g., requests are sent to the first cell, identified based at least in part on the first path from the routing metadata). Similar to rule 804, the truth table 800 may include rule 806 corresponding to a combination of a tuple response of a first cell indicating that the block device is present within the first cell and a tuple response of a second cell indicating that the block device, while present in the second cell, the block device is in a pre-create migrated state. In this scenario, requests to generate a snapshot of the block device are to be transmitted in accordance with the first path, as the first cell maintains the authoritative location of the block device as a result of the second cell indicating that its version of the block device is in a pre-create migrated state to prevent the creation of corrupt snapshots. Rule 808 of the truth table 800 may correspond to a combination of a tuple response of a first cell indicating that the block device is present within the first cell and a tuple response of a second cell indicating that the block device is not present in the second cell. In this scenario, the rule 808 may indicate that requests for creation of a snapshot of the block device are to be routed in accordance with the first path, as the cell identified in the first path is identified as the only location having the block device.

Rule 810 of the truth table 800 may apply to a scenario whereby the tuple response of the first cell indicates that the block device, while present within the first cell, is in the process of being migrated to the second cell and the tuple response of the second cell indicates that the block device is present in the second cell. Similar to rule 804 described above, the router may determine, based at least in part on rule 810, that requests to generate a snapshot of the block device are to be routed in accordance with the second path, as the second cell maintains the authoritative location of the block device (e.g., is not in migration and the other response indicates migration occurring to the second cell).

Rules 812-816 also correspond to scenarios whereby the tuple response of the first cell indicates that the block device, while present within the first cell, is in the process of being migrated to the second cell. In rule 812 of the truth table 800, the tuple response from the second cell may indicate that the block device is present in the second cell but also in the process of being migrated to the first cell. Since both cells indicate that the block device is in a state of migration, rule 812 may indicate that the router is to retry the requests to these cells at a later time in order to determine whether migration has been completed and a definitive location of the block device has been established. In an embodiment, the router may retry these requests a limited number of times. For instance, if the router receives tuple responses resulting in an invocation of rule 812 or any other rule that indicates that the router is to retry these requests at a later time, the router may determine whether the number of possible retries attempted by the router exceeds a threshold. If the number of possible retries exceeds the threshold, the router may determine that there is a fault in the partitioning system and return an error message to the user.

Rule 814 of the truth table 800 may correspond to a scenario whereby the second cell indicates that the block device is present in the second cell but in a pre-create migrate state. Since the first cell indicates that the block device is in the process of being migrated to the second cell, the rule 814 may indicate that the router should retry its requests to the cells at a later time in order to determine whether migration has been completed, resulting in an alternative response from the first cell that can be used to determine where requests to generate snapshots of the block device are to be routed. Similar to rule 814, rule 816 of the truth table 800 may indicate that the router is to retry its requests. In rule 816, the second cell may indicate that the block device is not present in the second cell. Since the first cell has indicated that the block device is being migrated to the second cell, rule 816 may prompt the router to retry its requests to the cells at a later time, as migration of the block device to the second cell may be completed, resulting in an alternative response from the second cell.

Rule 818 of the truth table 800 may be similar to rule 806 described above, except that the tuple response from the first cell may indicate that the block device exists within the first cell in a pre-create migrated state while the tuple response from the second cell may indicate that the block device is present in the second cell. In this scenario, requests to generate a snapshot of the block device are to be transmitted in accordance with the second path, as the second cell maintains the authoritative location of the block device as a result of the first cell indicating that its version of the block device is in a pre-create migrated state to prevent the creation of corrupt snapshots.

Rules 820-824 may also correspond to scenarios whereby the first cell indicates that the block device is present within the first cell in a pre-create migrated state. Rule 820 may indicate that migration of the block device is being performed from the second cell to the first cell. Thus, a definitive location of the block device may not be immediately available to the router. This may cause the router to retry its requests to the cells for tuple responses at a later time. This may enable the migration process from the second cell to the first cell to be completed and, thus, change the tuple responses from the cells. Rule 822 may indicate that the block device is present in both cells in a pre-create migrated state. As noted above, the pre-create migrated state for a block device is used to prevent the creation of corrupt snapshots in the event of a rollback from a new cell to an original cell. Since the scenario presented in rule 822 makes it difficult to know the exact location of the block device in the pre-create migrated state, the router may be unable to prevent the creation of corrupt snapshots if a catastrophic event occurs involving either cell. Thus, if rule 822 is invoked, the router may indicate that there is a fault in the partitioning system and return an error message to the user. Rule 824 may indicate that the block device is not present in the second cell. Since the block device, as specified in rule 824, is present in the first cell in a pre-create migrated state, the truth table 800 may indicate to the router that requests to generate a snapshot of the block device are to be routed in accordance with the second path.

Rules 826-832 may correspond to scenarios whereby the first cell indicates that the block device is not present in the first cell. If the second cell indicates, in its tuple response, that the block device is present in the second cell, rule 826 may be invoked from the truth table 800. Rule 826 may indicate that requests to generate snapshots of the block device are to be routed in accordance with the second path (e.g., to the second cell), as the block device is present in the second cell. Alternatively, if the second cell indicates that the block device is present within the second cell in a state of migration, rule 828 may be invoked from the truth table 800. Rule 828 may indicate that the router is to retry its requests to the cells to provide tuple responses at a later time, as the block device may be in the process of being migrated to the first cell. Rule 830 may be similar to rule 824 described above except that in accordance with rule 830, the second cell indicates that the block device exists within the second cell in a pre-create migrated state. Thus, rule 830 may cause the block device to route requests to generate a snapshot of the block device to the first cell identified via the first path. Rule 832 may correspond to a scenario whereby the block device is not present in either cell. If both cells indicate that the block device is not present, rule 832 may result in the router identifying a fault within the partitioning system. The router may transmit a notification to the user to indicate that the specified block device is not present in the block-level data storage service.

Figure 9:
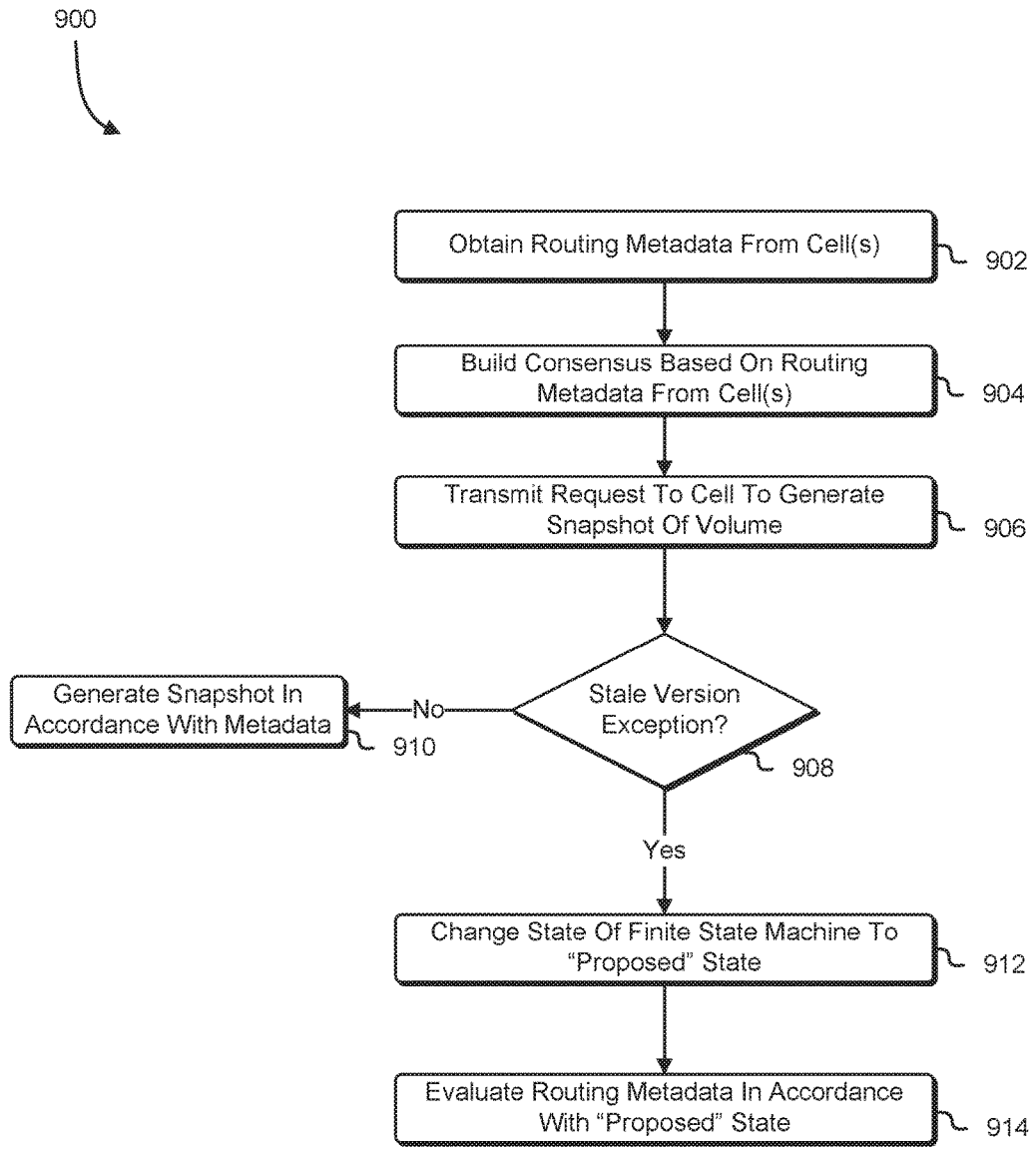
FIG. 9 shows an illustrative example of a process for evaluating routing metadata from a proposed state in response to a stale version exception from a cell in accordance with at least one embodiment.

As noted above, a router may utilize routing metadata obtained from a cell of the block-level data storage service to determine how to route requests for the creation of snapshots of a block device. The router may maintain a finite state machine, which may be in the "active" state in response to receiving routing metadata that includes active metadata (e.g., an entry in the routing metadata has a type attribute value of "active"). Requests may be processed in accordance with the active metadata until a stale version exception is received from a cell, indicating that proposed metadata from the routing metadata is to be used in addition to the active metadata to determine how to route requests to generate a snapshot of a block device. Accordingly, FIG. 9 shows an illustrative example of a process 900 for evaluating routing metadata from a proposed state in response to a stale version exception from a cell in accordance with at least one embodiment. The process 900 may be performed by the router, which may query cells of the block-level data storage service to obtain and utilize routing metadata for identifying how requests to generate snapshots for block devices are to be routed to the cells. In some instances, the process 900 may be performed by another computer system, process, or application operating in conjunction with the router. Further, certain operations, as described below, may be performed by a target cell that receives requests from the router to generate a snapshot of a block device.

The block-level device storage service may cause a router to become operational for the processing of requests from users to create and/or access resources in the various cells maintained by the block-level device storage service. The router may maintain a finite state machine, which may be used by the router to determine the operations to be performed based at least in part on routing metadata obtained from the cells or from a metadata storage service. The finite state machine may be invoked in an "started" state. In this state, the router may perform an asynchronous refresh of the metadata within the cells of the block-level data storage service. The router may query the one or more cells maintained by the block-level data storage service to obtain 902 routing metadata from each of the one or more cells. The routing metadata from each cell may specify information usable by the router to determine how to process requests to generate snapshots for a block device.

In response to receiving routing metadata from each of the cells maintained by the block-level data storage service, the router may evaluate the routing metadata to build 904 a consensus for the routing metadata that may be utilized to identify the location of resources (e.g., block devices) within the various cells. In an embodiment, as partitioning of cells is performed, a subset of cells of the block-level data storage service obtains updated routing metadata that specifies the location of resources post-migration. Cells that are not part of the subset may maintain routing metadata that has not been updated. Thus, the router may evaluate the routing metadata from each of these cells to determine what routing metadata is being maintained by the majority of cells. This may be utilized by the router to generate the consensus routing metadata, which may be used to determine where requests to create a snapshot of a particular block device are to be routed.

In an embodiment, the router evaluates the consensus routing metadata to determine whether the routing metadata includes active metadata (e.g., an entry having a type attribute of "active"). If the routing metadata includes active metadata, the finite state machine advances to the "active" state. The router may use the active metadata to determine where to route requests to create a snapshot of the block device. For instance, the router may use the identifier of the block device to identify the corresponding cell in which the snapshot is to be created. The router may transmit 906 a request to the identified cell to generate the snapshot of the volume (e.g., block device). In an embodiment, the request specifies the version attribute value corresponding to the active metadata. In response to the request, the cell determines whether the enforced version for the cell is set to the same value as that specified in the request. If the version attribute values do not match (e.g., partitioning of the cell has begun), the cell may report an exception to the router indicating that the version attribute value provided by the router is now stale (e.g., not valid, expired, etc.). Further, the cell may report the new enforced version attribute value of the cell to the router in addition to the stale version exception. Thus, based at least in part on the response from the cell, the router may determine 908 whether a stale version exception has been indicated.

If the version attribute values match (e.g., there is no stale version exception reported by the cell), the cell processes the request from the router and generates 910 the snapshot of the block device. However, if the cell reports a stale version exception in response to the request from the router, the router queries the finite state machine to determine whether the finite state machine can transition to the "proposed" state. For instance, the router may evaluate the consensus routing metadata to determine whether the consensus routing metadata includes proposed metadata having a version attribute value equal to the enforced version attribute value provided by the cell. If proposed metadata is available, the router changes 912 the state of the finite state machine from the "active" state to the "proposed" state. If the finite state machine is in the "proposed" state, the router may evaluate 914 active metadata and proposed metadata in the routing metadata to determine which cell to transmit a request to generate a snapshot of a block device. For example, in response to a request to create a snapshot for block device, the router may evaluate the range attributes for the active metadata and the proposed metadata in the routing metadata.

Figure 10:
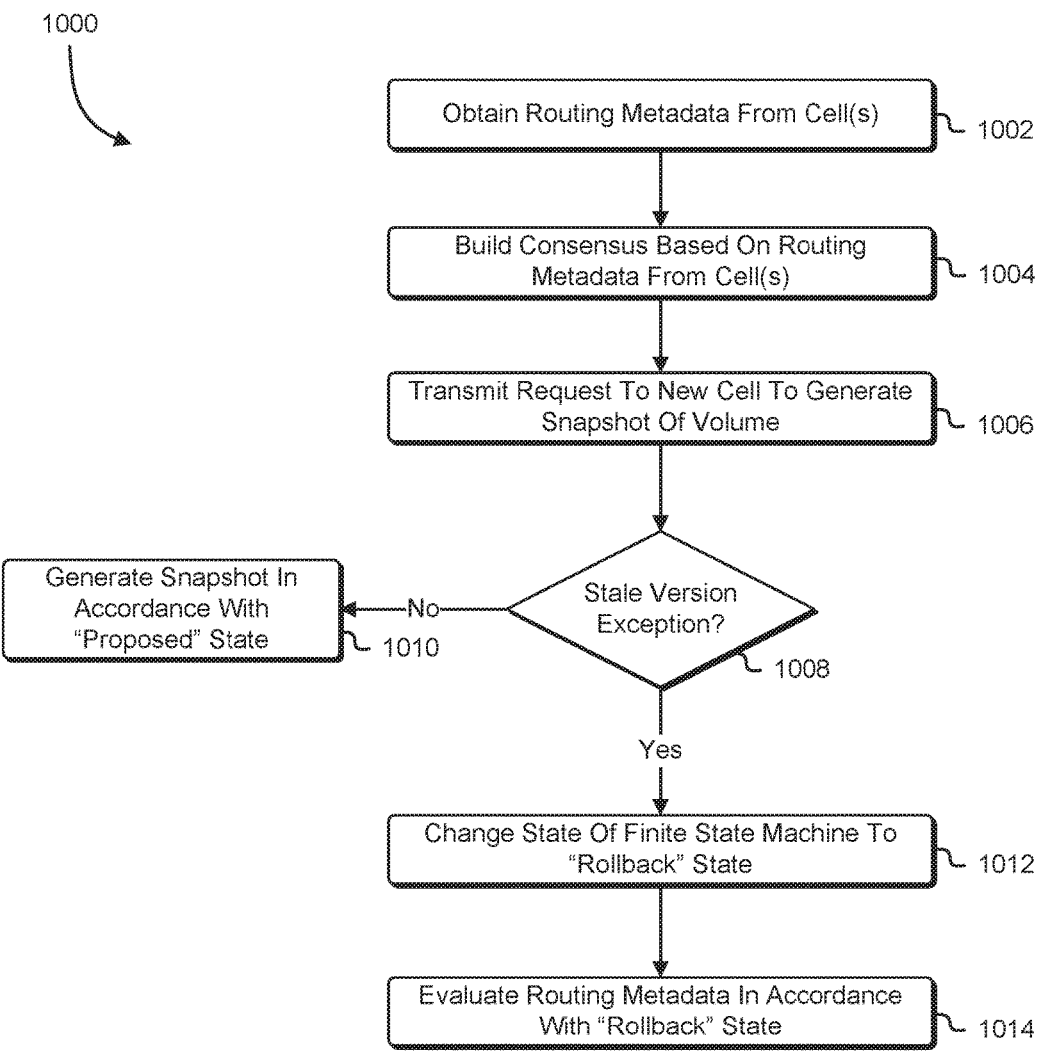
FIG. 10 shows an illustrative example of a process for evaluating routing metadata from a rollback state in response to a stale version exception from a cell in accordance with at least one embodiment.

FIG. 10 shows an illustrative example of a process 1000 for evaluating routing metadata from a rollback state in response to a stale version exception from a cell in accordance with at least one embodiment. The process 1000 may be performed by the aforementioned router or by another computer system, process, or application operating in conjunction with the router. Further, similar to the process 900 described above, certain operations of the process 1000 may be performed by a target cell that receives requests from the router to generate a snapshot of a block device. In the process 1000, the finite state machine of the router may be in the "proposed" state, which may cause the router to evaluate active metadata and proposed metadata from the routing metadata to determine how to route requests to generate a snapshot of a block device. In an embodiment, the router also obtains 1002 additional routing metadata from the one or more cells of the block-level data storage service. This additional routing metadata may be identical to the routing metadata utilized by the router if migration to a new cell is still being performed. Alternatively, the additional routing metadata may include rollback metadata if the block-level data storage device has initiated a rollback of resources from the new cell to the original cell.

In response to receiving routing metadata from each of the cells maintained by the block-level data storage service, the router may evaluate the routing metadata to build 1004 a consensus for the routing metadata that may be utilized to identify the location of resources within the various cells. Similar to the process 900 described above, the router may evaluate the routing metadata from each of these cells to determine what routing metadata is being maintained by the majority of cells. This may be utilized by the router to generate the consensus routing metadata, which may be used to determine where requests to create a snapshot of a particular block device are to be routed. In an embodiment, the consensus routing metadata specifies a new entry corresponding to a rollback state. For instance, if a migration is in the process of being rolled back due to an issue with the new destination cell, the block-level data storage service may update the routing metadata for each cell to indicate this rolling back of the resources.

In response to a request to generate a snapshot of a block device, the router may utilize the consensus routing metadata to determine the location of the block device and, based at least in part on the identified location, which cell is to receive the request. For instance, in response to a request to create a snapshot for a block device, the router may evaluate the range attributes for the active metadata and the proposed metadata in the routing metadata. If the router determines that both the active metadata and the proposed metadata indicate that the resources corresponding to the hash of the block device identifier are in the same cell, the router may transmit 1006 the request to the identified cell. However, if the router determines that there is a conflict between the active metadata and the proposed metadata with regard to where the resources corresponding to the hash of the block device identifier are, and the block device is to be newly created in a cell, the router may use the merit attribute values for the active metadata and the proposed metadata to determine where the request should be transmitted. Alternatively, if the router determines that the block device is not new (e.g., was previously created), the router may query each cell in accordance with its corresponding merit attribute value to determine the state of the block device within each cell and, based at least in part on the responses from the cells, determine an authoritative location of the block device. As noted above, proposed metadata may have a higher merit attribute value than the active metadata. Thus, the values specified in the proposed metadata may correspond to a high merit path while the values specified in the active metadata may correspond to a low merit path for path resolution purposes. In an embodiment, the router transmits 1006 the request in accordance with the high merit path (e.g., the proposed metadata) if the block device is to be created.

Similar to the process 900 described above, the router may determine 1008 whether the cell to which the request was transmitted has returned a stale version exception notification. If the router does not receive a stale version exception notification from the cell identified via the proposed metadata, the router may cause the cell to generate 1010 the snapshot of the block device in the cell in accordance with the "proposed" state. However, if the router receives a stale version exception message from cell, the router may evaluate the consensus routing metadata to determine whether there is an entry corresponding to the enforced version attribute value provided by the cell. For instance, if the consensus routing metadata specifies rollback metadata, the rollback metadata may have a corresponding version attribute value that is the same as the enforced version attribute value provided by the cell. If the consensus routing metadata includes rollback metadata that has a version attribute value equal to the enforced version attribute value reported by the cell, the router may cause the finite state machine to change 1012 its state from the "proposed" state to the "rollback" state. As noted above, the routing metadata may specify active metadata, proposed metadata, and rollback metadata. While the finite state machine is in the "rollback" state, the router may evaluate the consensus routing metadata such that only the active metadata and the alternate metadata having the highest version attribute value are used. This causes the router to evaluate 1014 the consensus routing metadata in accordance with the "rollback" state, e.g., the active metadata and the rollback metadata, as the rollback metadata may have a higher version attribute value than the proposed metadata.

Figure 11:
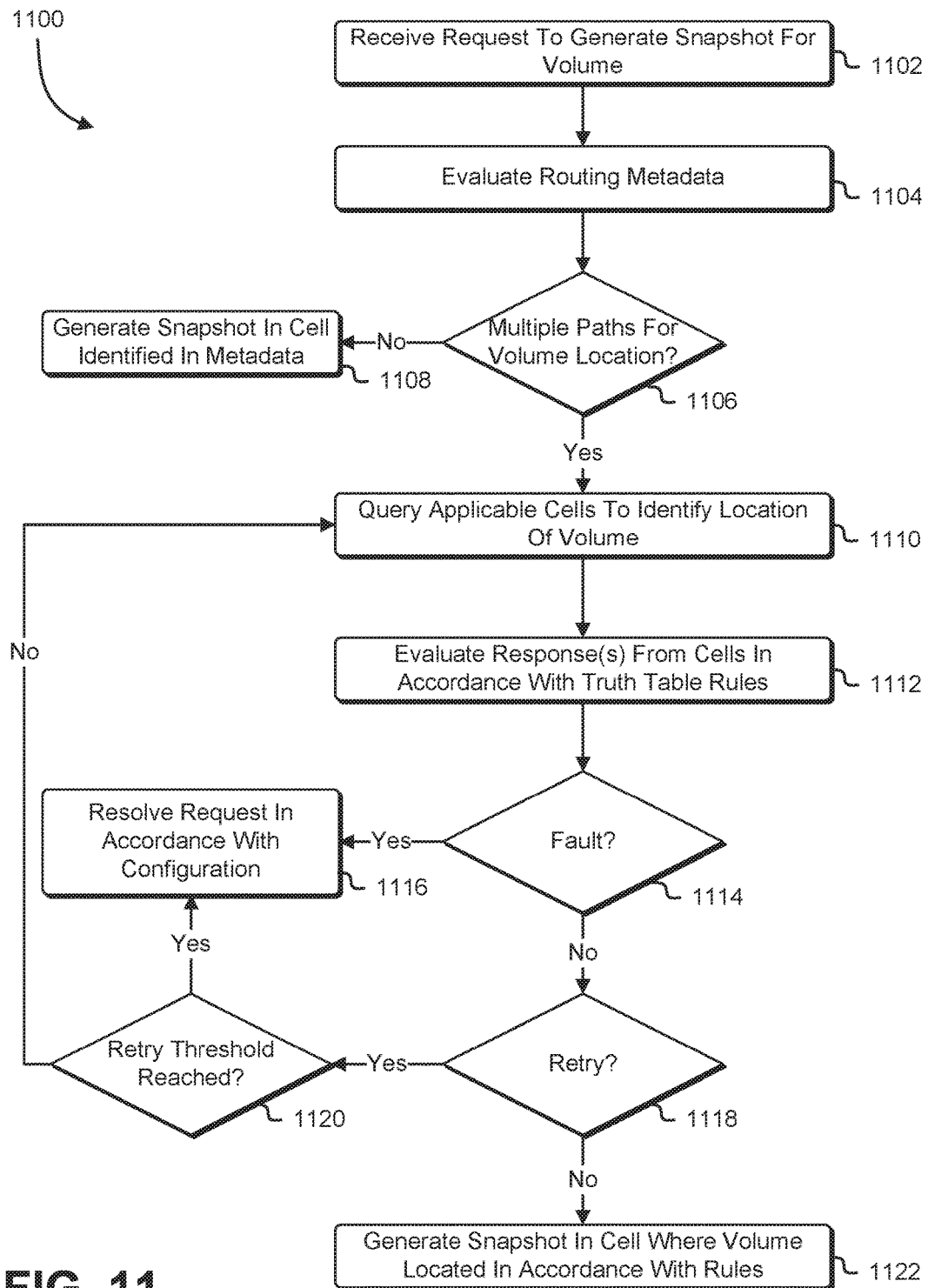
FIG. 11 shows an illustrative example of a process for evaluating responses from a set of cells in accordance with a truth table to determine a location for generation of a snapshot of a volume in accordance with at least one embodiment.

In an embodiment, if the router determines that there is a conflict between the active metadata and alternate metadata (e.g., proposed metadata or rollback metadata) with regard to where the resources corresponding to the hash of the block device identifier are, the router may use the merit attribute values for the active metadata and the applicable alternate metadata to determine where the request should be transmitted. As noted above, proposed metadata may have a higher merit attribute value than the active metadata. Thus, the values specified in the proposed metadata may correspond to a high merit path while the values specified in the active metadata may correspond to a low merit path for path resolution purposes. Alternatively, rollback metadata may have a lower merit attribute value than the active metadata, resulting in values specified in the rollback metadata corresponding to a low merit path while values specified in the active metadata corresponding to a high merit path for path resolution purposes. The router may receive responses from cells corresponding to these paths, whereby the responses may indicate the status of the specified block device within the cells. In an embodiment, these responses may be evaluated against a truth table, which may be used to determine where requests to generate snapshots of a block device are to be routed. Accordingly, FIG. 11 shows an illustrative example of a process 1100 for evaluating responses from a set of cells in accordance with a truth table to determine a location for generation of a snapshot of a volume in accordance with at least one embodiment. The process 1100 may be performed by the aforementioned router or by another computer system, process, or application operating in conjunction with the router. Further, certain operations of the process 1100 may be performed by a target cell that receives requests from the router to generate a snapshot of a block device.

In an embodiment, the router receives 1102 a request from a user of the block-level data storage service or from another entity to generate a snapshot for a volume (e.g., block device). The request may specify an identifier of the volume, which the router may use to obtain a hash value usable to identify a path for the request to a cell of the block-level data storage service. In response to the request, the router may evaluate 1104 the routing metadata to identify any paths that correspond to the location of the volume. For instance, the router may use the hash value of the identifier of the volume and the hash value ranges specified in the consensus routing metadata to determine which cell the snapshot should be created in. In an embodiment, if the finite state machine of the router is in either the "proposed" state or "rollback" state, the router evaluates the active metadata and the alternate metadata (e.g., proposed metadata or rollback metadata, based at least in part on the state of the finite state machine) to identify the possible paths for identifying the location of the block device.

Based at least in part on the evaluation of the routing metadata, the router may determine 1106 whether the routing metadata specifies multiple paths for the location of the block device. For instance, if the routing metadata specifies that, for the active metadata and the alternate metadata, the block device is located within a single cell, the router may transmit a request to the identified cell to generate 1108 the snapshot of the block device. However, if the router determines that multiple paths exist where the block device and other resources may be located, the router queries 1110 the cells corresponding to these paths to identify the location of the block device. In an embodiment, the router submits a request to the cell corresponding to the low merit path to provide a response with regard to the status of the block device within the cell (e.g., whether the block device is present, whether the block device is in a pre-create migrated state, and/or whether the block device is in the process of being migrated). For the high merit path, the router may submit another request to the cell identified in the high merit path to provide a response with regard to the status of the block device.

In an embodiment, the router receives, from each identified cell, a response that indicates the state of the block device within the cell. As noted above, the response from each cell may be a tuple with Boolean values corresponding to whether the resource is present in the cell, whether the resource exists in a pre-create migrated state, and whether the resource is in the process of being migrated. In response to receiving these tuple responses, the router evaluates 1112 the responses against a truth table to determine which path to utilize for identifying the location of the block device and, hence, for transmitting the request to generate a snapshot of the block device. The truth table may specify a set of rules corresponding to possible combinations of responses from the cells. Thus, based at least in part on the responses received from the cells the router may identify the applicable rule within the truth table and determine the appropriate path for transmitting the request to generate the snapshot.

As noted above, for certain combinations of responses from the cells, the truth table may indicate a fault. Thus, based at least in part on the evaluation of the responses against the truth table, the router may determine 1114 whether a corresponding rule indicates a fault within the partitioning system. If, based at least in part on an applicable rule, the router determines that the responses from the cells indicate a fault in the partitioning system, the router may resolve 1116 the request to generate the snapshot in accordance with a configuration of the system. For instance, if a fault is detected, the router may submit a safety call to a cell to mark the block device as being full. This may cause any snapshots generated based at least in part on the block device to also be full. Alternatively, the router may transmit a notification to the user that submitted the request to generate the snapshot to indicate that the request could not be fulfilled due to the detected fault.

If the router does not detect a fault based at least in part on the responses from the cells and the corresponding rule from the truth table, the router may determine 1118 whether the corresponding rule indicates that the router is to retry its query to the applicable cells to identify an authoritative location of the volume. For example, as illustrated in FIG. 8, if the responses indicate that the volume exist in both cells in a state of migration, the corresponding rule (e.g., rule 812) may indicate that the router is to retry its query of the cells at a later time. In an embodiment, if the router determines, based at least in part on a rule corresponding to the responses from the cells, that it is to retry its query, the router determines 1120 whether a retry threshold has been reached for submitting new queries to the cells. For example, the router may maintain a retry counter that incrementally increases as the router attempts a new query of the applicable cells in response to a retry indication in a corresponding rule. If the value of the retry counter exceeds the retry threshold, the router may resolve 1116 the request in accordance with the configuration of the system, as described above.

If the retry threshold has not been reached, the router may, at a later time, query 1110 the applicable cells to identify the authoritative location of the volume. The responses from these applicable cells may be similar to those previously received by the router that resulted in the retried query. Alternatively, the new responses from these cells may be different, as migration of the volume may have been completed in between queries to the cells. Thus, if different responses are received from the cells, a different rule may be identified that corresponds to these different responses. If no fault is detected and the corresponding rule does not indicate that a retry of the query is to be attempted, the router may transmit a request to the cell corresponding to the path identified in the truth table to generate 1122 a snapshot of the block device within the cell.

Figure 12:
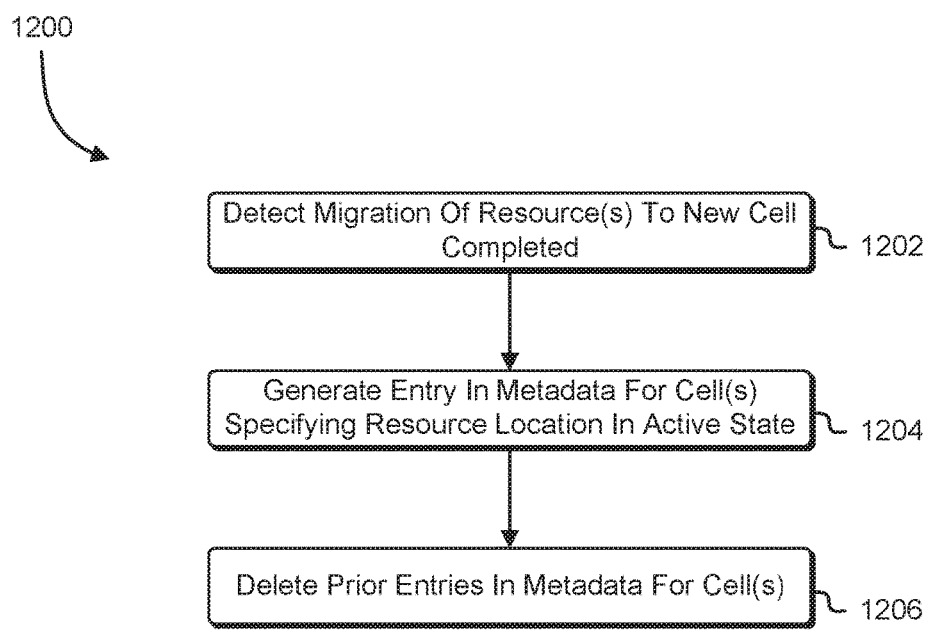
FIG. 12 shows an illustrative example of a process for updating routing metadata in response to successful migration from a cell to another cell in accordance with at least one embodiment.

FIG. 12 shows an illustrative example of a process 1200 for updating routing metadata in response to successful migration from a cell to another cell in accordance with at least one embodiment. The process 1200 may be performed by the block-level data storage service, the router, or any other computer system, process, or application that monitors migration of resources among cells of the block-level data storage service. In an embodiment, the block-level data storage service queries the various cells to determine whether migration from one cell to another has been completed in accordance with either the proposed metadata or the rollback metadata specified in the routing metadata made available by the cells and as requested by the block-level data storage service. Through this monitoring of the cells, the block-level data storage service may detect 1202 that migration of resources from one cell to another cell (e.g., a new cell) has been completed.

If the block-level data storage service detects that migration of resources from one cell to another cell has been completed, the block-level data storage service may generate 1204 an entry in the routing metadata in all cells to indicate a new active state for the cells. This entry may have a type attribute of "active," which may correspond to active metadata usable to decide the path for all resources if no alternate metadata in the routing metadata exists. Further, the entry may have a version attribute value that is greater than the version attribute value of any prior entries in the routing metadata. This new version attribute value may also be assigned to the cells. The block-level data storage service may delete 1206 any alternate metadata from the routing metadata maintained within the cells. The router may obtain this new routing metadata from the cells and, if the new consensus routing metadata does not include any alternate metadata, the router may cause the finite state machine to flip from the "rollback" state or the "proposed" state to the "active" state.

Figure 13:
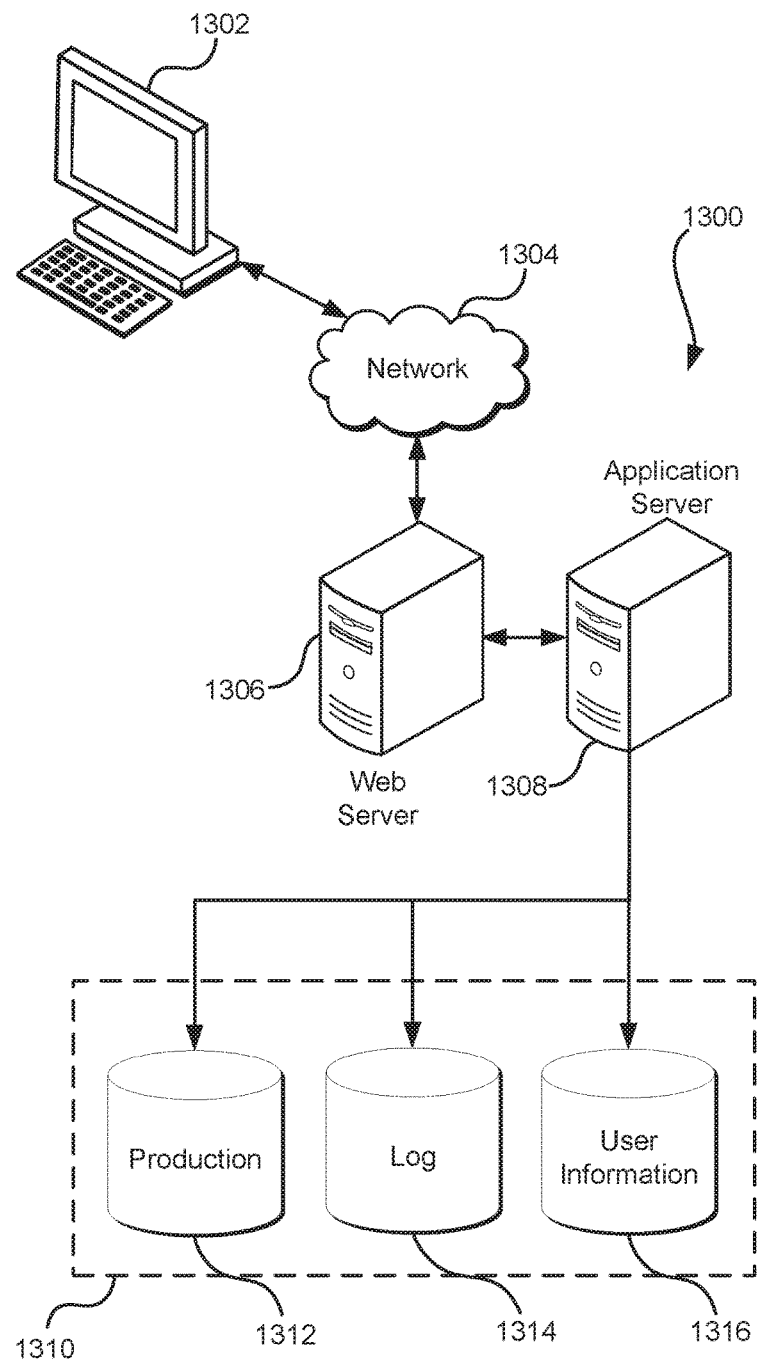
FIG. 13 shows an illustrative example of a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto and the application server 1308 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
determining, based at least in part on a request to generate a snapshot of a block device, routing metadata comprising first metadata and second metadata, the first metadata corresponding to a first cell corresponding to a first set of hosts that store data content of the block device and the second metadata corresponding to a second cell corresponding to a second set of hosts that store the data content of the block device;
transmitting a second request to the first set of hosts and to the second set of hosts to cause the first set of hosts to generate a first response and to cause the second set of hosts to generate a second response, the first response corresponding to a first state of the block device and the second response corresponding to a second state of the block device;
determining, based at least in part on the first state, the second state, and a predetermined set of rules defining operations corresponding to a plurality of outcomes associated with the first state and the second state whereby the plurality of outcomes corresponds to preservation of a lineage of snapshots for block devices in the first set of hosts and the second set of hosts, a set of the operations, wherein the set of operations are performable to identify a cell, from the first cell and the second cell, corresponding to a set of hosts, from the first set of hosts and the second set of hosts, that store the data content of the block device;
performing a subset of the set of the operations to identify the cell, wherein the subset of the set of the operations corresponds to at least one outcome from the plurality of outcomes;
causing the set of hosts to generate the snapshot of the block device in the cell; and
updating the first state and the second state based at least in part on an outcome of generating the snapshot.

2. The computer-implemented method of claim 1, wherein:
the first state corresponds to the data content of the block device being stored in the set of hosts of the cell;
the second state corresponds to the data content of the block device being migrated from the second cell to the set of hosts of the cell; and
the at least one outcome is that the data content of the block device is stored in the set of hosts of the cell.

3. The computer-implemented method of claim 1, wherein:
the first state corresponds to the data content of the block device being absent from the set of hosts of the cell;
the second state corresponds to the data content of the block device being stored in the second set of hosts of the second cell in a pre-create migrated state, the pre-create migrated state corresponding to the block device being unavailable to generation of snapshots of the block device to prevent generation of corrupt snapshots of the block device; and
the at least one outcome is that the request to generate the snapshot is to be transmitted to the set of hosts of the cell.

4. The computer-implemented method of claim 1, wherein:
the first state corresponds to the data content of the block device being stored in the set of hosts of the cell;
the second state corresponds to the data content of the block device being absent from the second set of hosts of the second cell; and
the at least one outcome is that the data content of the block device is stored in the set of hosts of the cell.

5. A system, comprising:
one or more processors; and
memory that stores computer-executable instructions that, as a result of being executed, cause the system to:
determine, based at least in part on meta data corresponding to a resource, a first location of the resource and a second location of the resource, the first location and the second location being distinct;
determine a first state of the resource in the first location and a second state of the resource in the second location;
identify, based at least in part on the first state, the second state, and a predetermined set of rules defining operations corresponding to a plurality of outcomes associated with the first state and the second state whereby the plurality of outcomes corresponds to preservation of a lineage of snapshots for resources in the first location and the second location, an authoritative location of the resource; and
transmit a request to a set of hosts of the authoritative location of the resource to perform, using the resource, an operation.

6. The system of claim 5, wherein the computer-executable instructions that, as a result of being executed, cause the system to determine the first state of the resource in the first location and the second state of the resource in the second location further cause the one or more processors to transmit a request to a first set of hosts of the first location and to a second set of hosts of the second location to cause the first set of hosts to generate a first response and to cause the second set of hosts to generate a second response, the first response corresponding to the first state and the second response corresponding to the second state of the resource.

7. The system of claim 6, wherein:
the first response is a first tuple comprising a first set of Boolean values corresponding to the first state; and
the second response is a second tuple comprising a second set of Boolean values corresponding to the second state.

8. The system of claim 5, wherein:
the first state of the resource in the first location corresponds to the resource being migrated from the first location to the second location;
the second state of the resource in the second location corresponds to the resource being located in the second location; and
the authoritative location is the second location.

9. The system of claim 5, wherein:
the first state of the resource in the first location corresponds to the resource being located in the first location in a pre-create migrated state, whereby the resource being in the pre-create migrated state results in the resource being unavailable to prevent generation of corrupt snapshots of the resource;
the second state of the resource in the second location corresponds to the resource being located in the second location; and
the authoritative location is the second location.

10. The system of claim 5, wherein the operation includes generating a snapshot of the resource in the authoritative location.

11. The system of claim 5, wherein:
the first state of the resource in the first location corresponds to the resource being located in the first location;
the second state of the resource in the second location corresponds to the resource being absent from the second location; and
the authoritative location is the first location.

12. The system of claim 5, wherein:
the first location is a first cell corresponding to a first set of hosts that store data content of the resource; and
the second location is a second cell corresponding to a second set of hosts that store the data content of the resource.

13. A non-transitory computer-readable storage medium having stored storing thereon executable instructions that, as a result of being executed by one or more processors of a computer system, cause the computer system to at least:
determine, based at least in part on a request to perform an operation on a resource, a first location of the resource and a second location of the resource;
process responses from the first location and the second location to determine a first state of the resource and a second state of the resource;
determine, based at least in part on the first state, the second state, and a predetermined set of rules defining operations corresponding to a plurality of outcomes associated with the first state and the second state whereby the plurality of outcomes corresponds to preservation of a lineage of snapshots for resources in the first location and the second location, if the resource is stored in the first location or in the second location, resulting in a determination; and
perform a set of operations in accordance with the determination.

14. The non-transitory computer-readable storage medium of claim 13, wherein the responses from the first location and the second location comprise a set of tuples, whereby the set of tuples include at least:
a first tuple comprising a first set of Boolean values corresponding to the first state; and
a second tuple comprising a second set of Boolean values corresponding to the second state.

15. The non-transitory computer-readable storage medium of claim 13, wherein the instructions that cause the computer system to determine the first location of the resource and the second location of the resource, further cause the computer system to identify routing metadata comprising first metadata and second metadata, the first metadata corresponding to the first location and the second metadata corresponding to the second location.

16. The non-transitory computer-readable storage medium of claim 13, wherein:
the first state corresponds to the resource being absent from the first location;
the second state corresponds to the resource being migrated from the second location to the first location;
the determination is that second responses are to be obtained from the first location and the second location to determine a new first state of the resource and a new second state of the resource; and
the instructions that cause the computer system to perform the set of operations in accordance with the determination further cause the computer system to transmit a second request to the first location and to the second location to obtain the new first state of the resource and the new second state of the resource.

17. The non-transitory computer-readable storage medium of claim 13, wherein:
the first state corresponds to the resource being located in the first location;
the second state corresponds to the resource being located in the second location;
the determination is that metadata of the resource within a location is to indicate that the resource is full; and
the instructions that cause the computer system to perform the set of operations in accordance with the determination further cause the computer system to:
select the location from the first location and the second location; and
cause metadata of the resource within the location to indicate that the resource is full.

18. The non-transitory computer-readable storage medium of claim 13, wherein the instructions that cause the computer system to determine the first location of the resource and the second location of the resource further cause the computer system to:
identify a first merit attribute value of the first location;
identify a second merit attribute value of the second location, whereby the second merit attribute value is greater than the first merit attribute value;
transmit a first request to the first location to identify the first state, the first request specifying creation of the resource in the first location in a pre-create migrated state if the resource is absent from the first location, the pre-create migrated state corresponding to the resource being in a pre-create migrated state, whereby the resource being in the pre-create migrated state results in the resource being unavailable to prevent generation of corrupt snapshots of the resource; and
transmit a second request to the second location to identify the second state.

19. The non-transitory computer-readable storage medium of claim 13, wherein:
the first state corresponds to the resource being absent from the first location;
the second state corresponds to the resource being located in the second location;
the determination is that the second location is to be utilized for processing of requests associated with the resource; and
the instructions that cause the computer system to perform the set of operations in accordance with the determination further cause the computer system to transmit the request to perform the operation on the resource to the second location.

20. The non-transitory computer-readable storage medium of claim 13, wherein:
the first state corresponds to the resource being migrated from the first location to the second location;
the second state corresponds to the resource being migrated from the second location to the first location;
the determination is that second responses are to be obtained from the first location and the second location to determine a new first state of the resource and a new second state of the resource; and
the instructions that cause the computer system to perform the set of operations in accordance with the determination further cause the computer system to transmit a second request to the first location and to the second location to obtain the new first state of the resource and the new second state of the resource.

* * * * *